United States Patent [19]
Harris

[11] Patent Number: 5,220,177
[45] Date of Patent: Jun. 15, 1993

[54] METHOD AND APPARATUS FOR EDGE DETECTION AND LOCATION

[75] Inventor: David E. Harris, Powell, Ohio

[73] Assignee: Harris Instrument Corporation, Columbus, Ohio

[21] Appl. No.: 720,260

[22] Filed: Jun. 24, 1991

[51] Int. Cl.⁵ .......................... G01N 21/86; G01V 9/04
[52] U.S. Cl. ..................................... 250/548; 250/561
[58] Field of Search ............... 356/381, 382, 375, 384, 356/385–387; 250/560, 561, 221, 222.1, 578, 205, 548, 557; 364/561, 562, 563

[56] References Cited

U.S. PATENT DOCUMENTS

| | | | |
|---|---|---|---|
| 3,448,278 | 8/1966 | O'Brien et al. | 250/219 |
| 3,567,320 | 3/1971 | Chitayat | 356/4 |
| 3,574,411 | 12/1974 | Zanoni | 356/167 |
| 3,653,770 | 4/1972 | Yamamuro | 356/160 |
| 3,724,948 | 4/1973 | Callan | 356/160 |
| 3,739,177 | 6/1973 | Ko | 250/561 |
| 3,781,115 | 12/1973 | Rader et al. | 250/560 |
| 3,856,412 | 12/1974 | Zanoni | 356/167 |
| 4,088,411 | 5/1978 | Ahlquist et al. | 356/167 |
| 4,123,169 | 10/1978 | Merilainen et al. | 356/167 |
| 4,300,836 | 11/1981 | Holmes et al. | 356/376 |
| 4,360,274 | 11/1982 | Norton-Wayne | 250/560 |
| 4,427,295 | 1/1984 | Nishiyama | 356/371 |
| 4,461,576 | 7/1984 | King | 356/375 |
| 4,465,937 | 8/1984 | Forbes | 250/560 |
| 4,499,383 | 2/1985 | Loose | 250/561 |
| 4,521,112 | 6/1985 | Kuwabara et al. | 356/375 |
| 4,521,113 | 6/1985 | Kuwabara et al. | 356/387 |
| 4,555,633 | 11/1985 | Bjorkelund | 250/560 |
| 4,559,451 | 12/1985 | Curl | 356/237 |
| 4,559,452 | 12/1985 | Igaki et al. | 250/560 |
| 4,648,718 | 3/1987 | Sadamitsu et al. | 356/387 |
| 4,679,941 | 7/1987 | Fujita | 356/384 |
| 4,680,806 | 7/1987 | Bolza-Schunemann | 250/561 |
| 5,006,719 | 4/1991 | Blaser | 250/560 |

*Primary Examiner*—David C. Nelms
*Assistant Examiner*—Hoa Q. Pham
*Attorney, Agent, or Firm*—Mueller and Smith

[57] ABSTRACT

Method and apparatus are provided of a variety wherein a linear array of light emitting diodes (LEDs) are positioned at one side of a material having an edge to be detected. A photoresponsive receiver is positioned on the opposite side of the material at a predetermined stand-off distance from the LED array. The visual LEDs of the array are energized by a drive current which is pre-selected such that light emitting from each exhibits substantially uniform intensity at the photodetecting receiver when non-attenuated by the material. Additionally, the photodetector at the receiver is configured having a length of at least 6 cm to substantially improve edge related data collection. The improvements provide for substantially enhanced measurement accuracy and permit the detection of edges of transparent and semi-transparent materials.

21 Claims, 13 Drawing Sheets

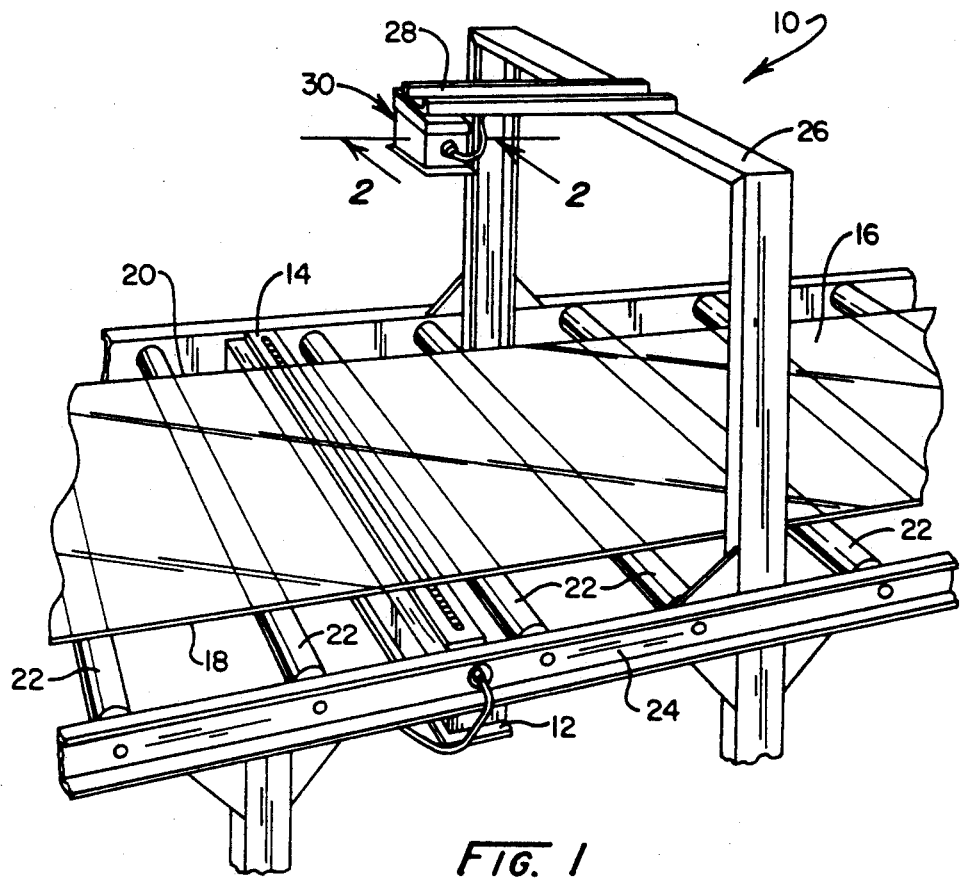
FIG. 1
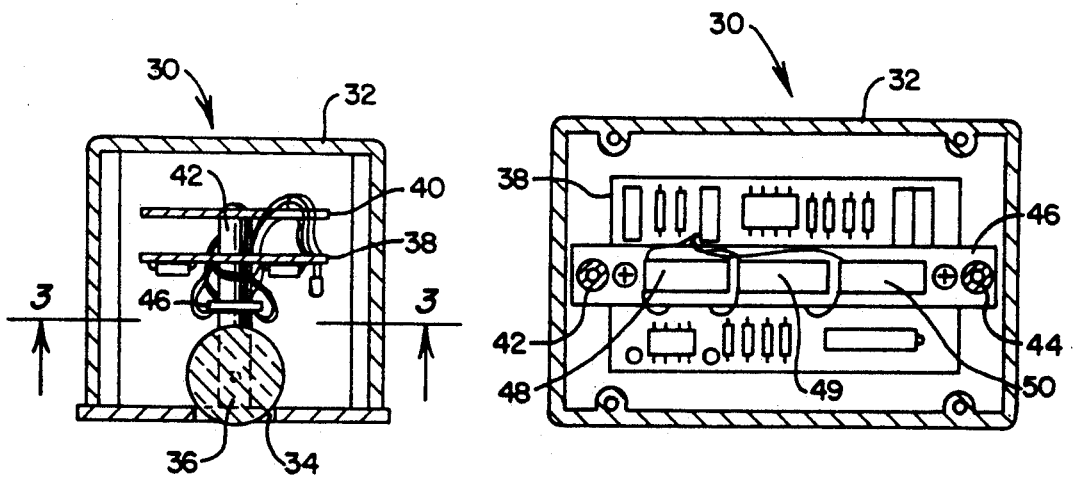
FIG. 2
FIG. 3

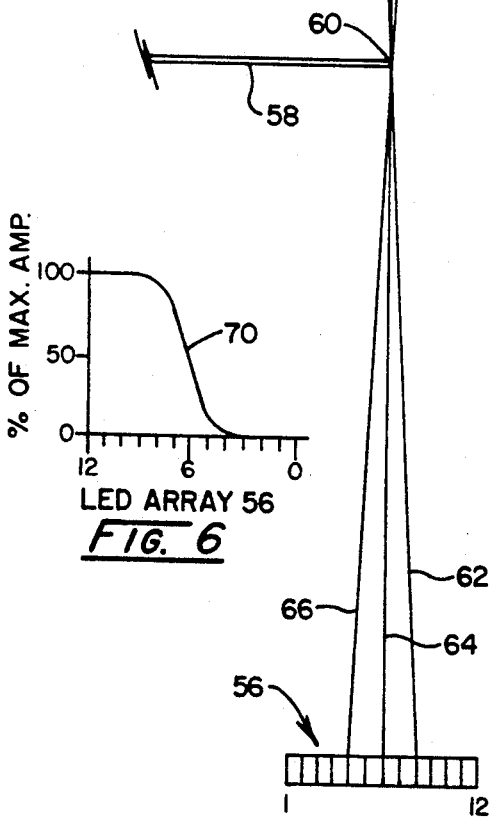

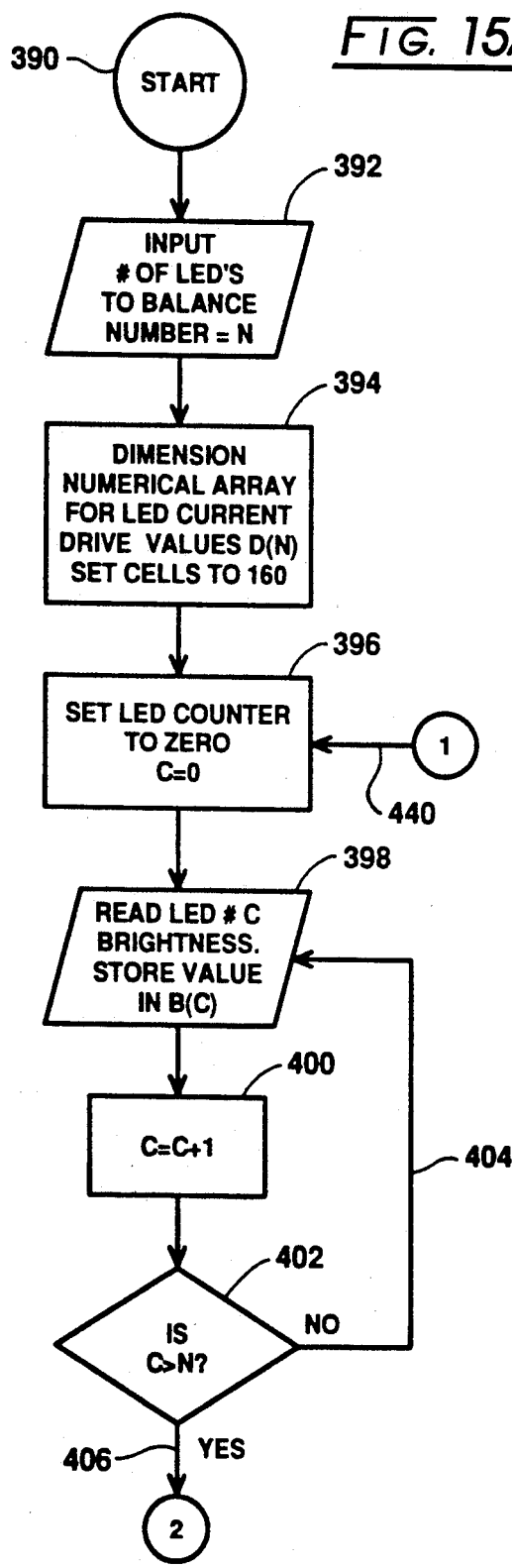
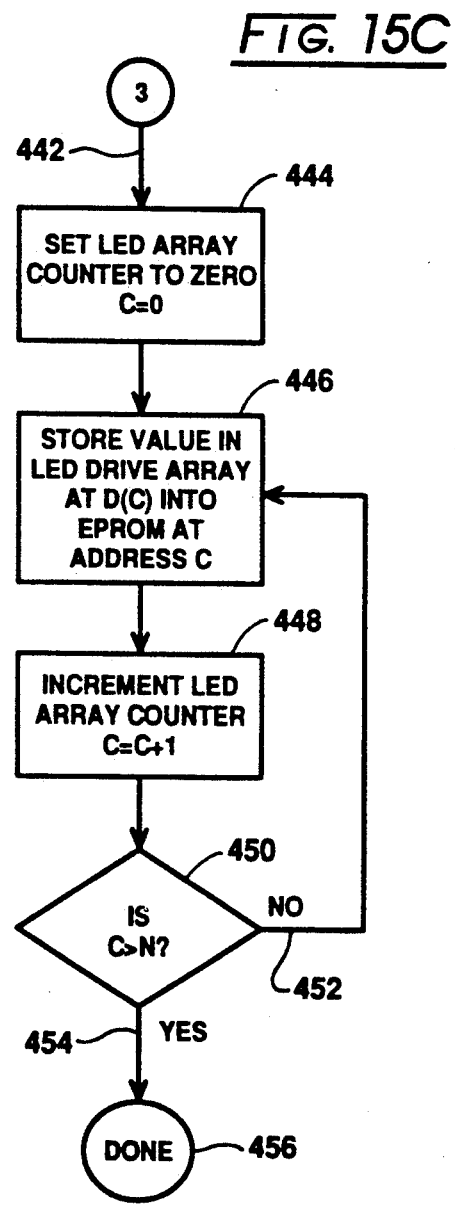

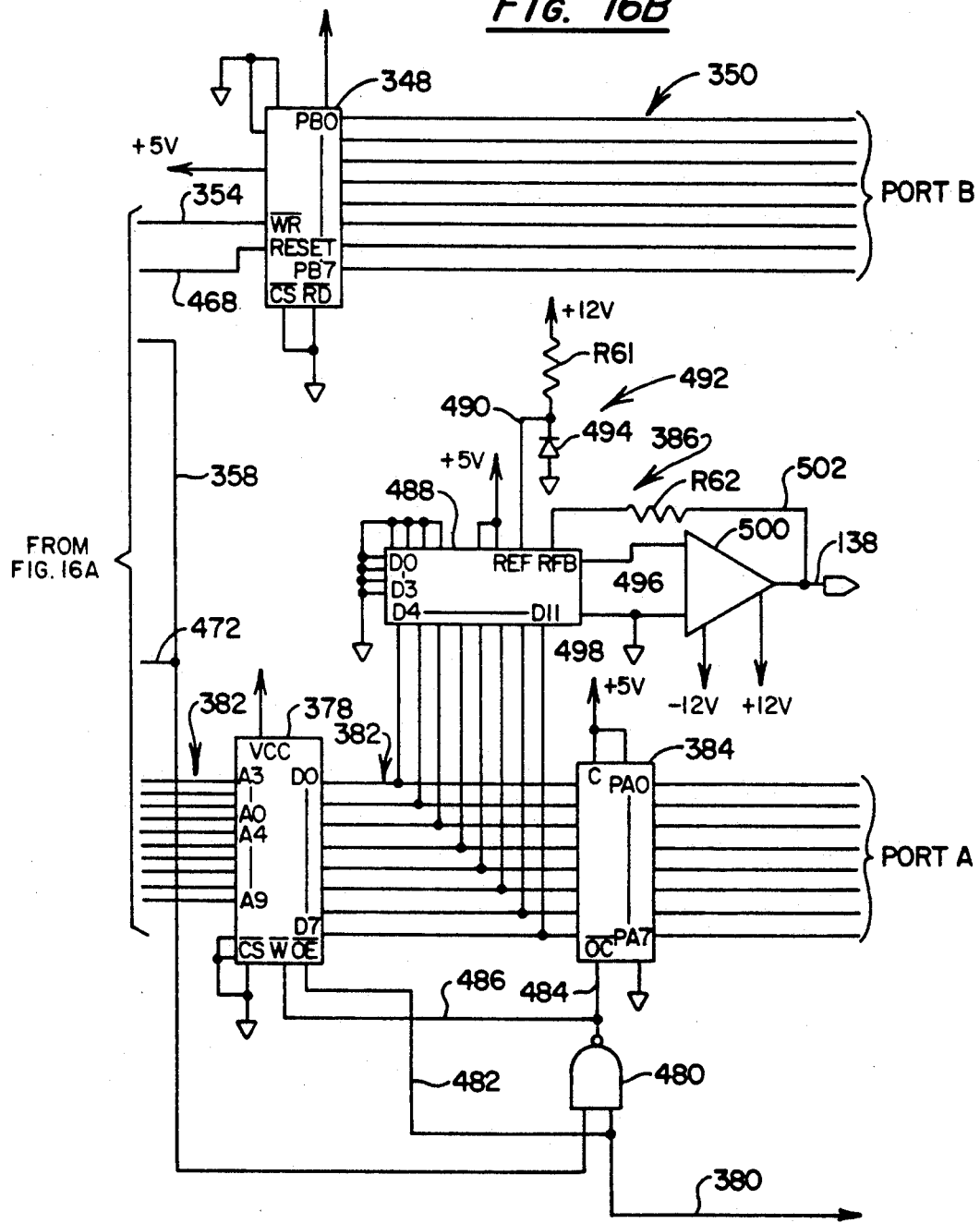

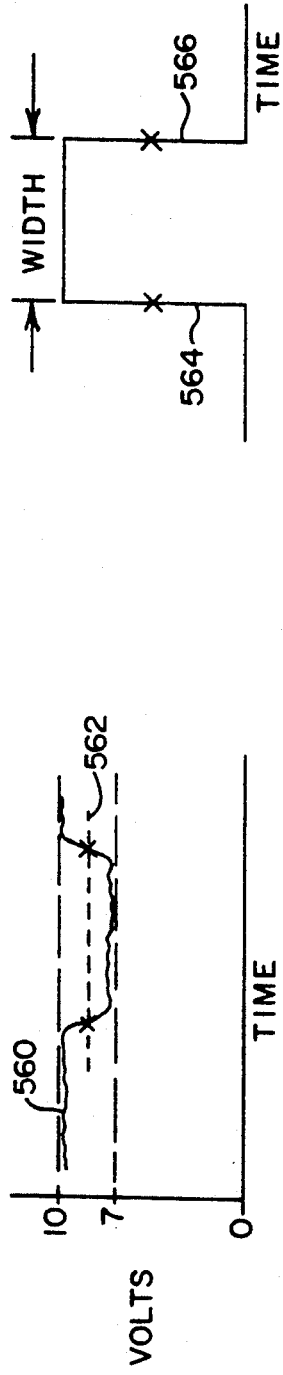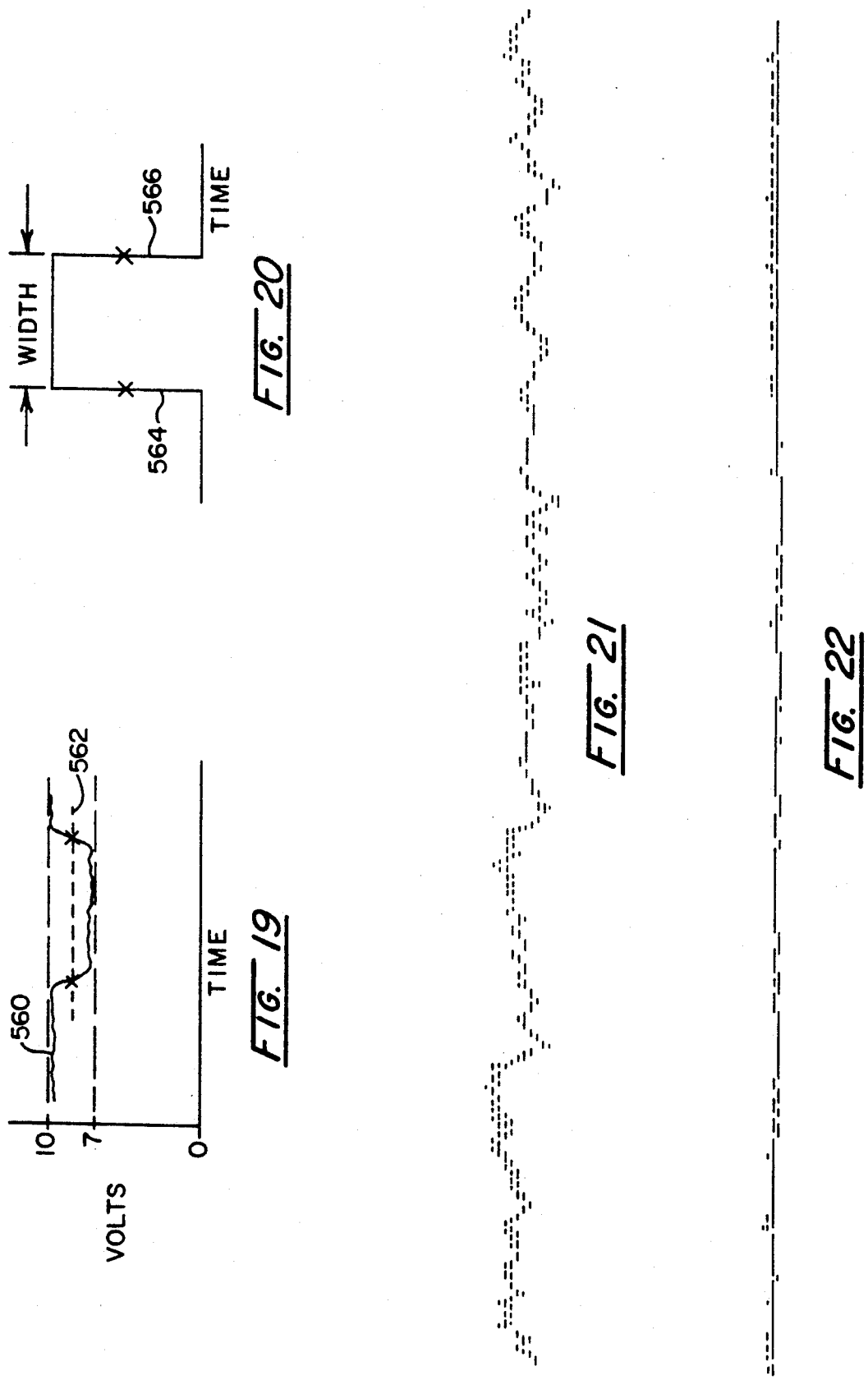

METHOD AND APPARATUS FOR EDGE DETECTION AND LOCATION

BACKGROUND OF THE INVENTION

The control of industrial processes has been a continuing subject of study and innovation on the part of investigators. One aspect of these studies has dealt with control over material dimension in the course of its production. For example, accurate control over the width of weblike cord employed in the manufacture of automotive tires assures a final balanced product capable of meeting the increasingly rigid tolerances mandated by the transportation industry. Similarly, many industries have introduced statistical process control procedures which call for very accurately produced supply materials such as sheet steel. In the latter regard, many steel using industries call for the initial production of rolled steel exhibiting accurately controlled widthwise dimensions. Periodic width checks on the part of plant personnel using manually manipulated measuring devices are no longer adequate to maintain dimensional tolerances now demanded. To achieve such dimensional control, accurate measurements generally must be carried out on a non-contacting and substantially continuous basis. The resultant process control not only achieves production accuracy, but also minimizes material waste otherwise resulting from continued production under out of tolerance conditions.

One measurement system which has found substantial acceptance in industry is marketed under the trademark "SCAN-A-LINE". This system employs a linear array of light emitting diodes positioned on one side of material such as a web or sheet or the like moving within a production process. The diodes of this array are illuminated in a scanning sequence having a stable time base, for example at a 20 KHz rate developed by a quartz crystal oscillator. Positioned above the moving material under production and opposite the associated diode array is a tuned photoresponsive receiver which reacts to the illumination emanating from those diodes which are unblocked or partially blocked at the edges of the moving material. Because diode arrays available in the marketplace typically are spaced at 1/10th inch and/or 1 mm center-to-center, the receiver and associated control system are called upon to carry out an extrapolation process to develop mandated accuracy in locating the position of an edge. This extrapolation is based upon the observation that each LED in the emitting array produces a cone of light and the light cones from adjacent LED's overlap each other in the light path to the photoresponsive receiver. An edge of a product being measured blocking the light path from the emitting diodes to the receiver will attenuate the light from more than one diode. For example, one LED might be attenuated by 12%, while the next adjacent diode is attenuated by 47% and still the next adjacent diode is fully blocked. The signal processing procedure carrying out extrapolation takes samples of the peak amplitude of the light received in sequence from the partially blocked and unblocked LEDs and develops therefrom a time based stairstep light output pattern representing a scan across the edge which, in effect, is smoothed through the utilization of a low pass filtering stage. The edge position of the material being observed then is defined as the time equivalent point on this smooth curve signal where the voltage drops to one-half of the peak LED signal amplitude.

The receiver component utilizes a solar cell form of silicon photodetector which has a length parallel to the array of diodes of 20 mm. This photoresponsive device is positioned above the diodes at what is termed a "stand-off distance" which preferably will be twice the length of the diode array itself. In practical applications, often constraints imposed by the industrial process will cause this distance to vary. Heretofore, in producing the LED emitting arrays, which may vary, for example, from 10 to 400 diodes for any of a variety of industrial applications, sub-components of the arrays, for example having 10 diodes, are evaluated for the purpose of developing a reasonably uniform light output intensity. In this regard, it has been observed that LED light output from an average purchased lot of the device varies by 30% or more.

As the requirements for continuous non-contacting dimensional evaluation of materials in production increases and additional applications of such measuring systems, for example in edge location and guiding are called for by industry, a concomitant need has developed to further increase the accuracy of this practical and relatively lower cost measuring system. Further, a desire has been expressed for expanding the utility of the instant system to carry out edge evaluations of materials which are not opaque, for example such as clear plastics and glass. Edge location for these materials assumes more and more importance in such fields as blown film formation and the like where the diameter of an inflated tube relates directly to the end product thickness. However, the attenuation of light emanating from a diode array on the part of such materials may be quite low under fully "blocking" conditions, for example in the 7% to 10% range. Generally, the only attenuation of light is the result of surface reflection or light refractive phenomena.

SUMMARY

The present invention is addressed to apparatus and method for enhancing the accuracy and range of applications of edge locating systems of a variety wherein output paths of an array of light emitting devices are selectively attenuated by the material defining an edge to be located and this attenuated light is detected at a spaced receiver or photodetection station. In one aspect, each of the light emitting devices, implemented as light emitting diodes (LEDs) is energized by a unique drive current which is pre-selected to cause the emission of light exhibiting substantially uniform intensity at the receiver when non-attenuated by the material under evaluation. Such balancing or optimization of the LED array light output not only achieves importantly enhanced system accuracy in carrying out edge location, but also substantially expands the range of application for such non-contacting measurement techniques. In the latter regard, the edge locating technique can be employed with transparent or semi-transparent materials. When so employed, the time based trigger signal from which edge data is developed is generated at a location in scan time between a transition of detected amplitudes representing a maximum value and a minimum value.

Another aspect of the invention serving to substantially improve system accuracy resides in the utilization of a photodetector assembly at the receiver of a lengthwise dimension of at least about 6 cm. This dimensioning serves to achieve a gathering of a greater amount of edge defining data. Where this enhanced detection approach is combined with the above-described LED balancing or optimization, system performance has been observed to be improved beyond what would be expected.

The invention also looks to a unique technique for deriving the drive current values used for LED array output optimization or balancing. With the technique, current drive values are adjusted with respect to an overall brightness average in an iterative procedure until a suitable convergence of light output amplitude is gained.

Another feature of the invention provides apparatus for locating an edge of material which includes an array of discrete light emitting devices located a select distance from one side of the material and extending partially outwardly from the edge, each of the devices being responsive to the application of a select value of current thereto to emit light of corresponding intensity. A photoresponsive receiver is located a predetermined stand-off distance from the opposite side of the material and is positioned for response to the light emitted by the devices which transitions between conditions of attenuation and non-attenuation in the vicinity of the edge to derive output signals corresponding with the amplitudes thereof. A drive network is provided which is responsive to control inputs for applying the select value of current to the discrete light emitting devices. A control arrangement is responsive to a predetermined drive value corresponding with each light emitting device for deriving corresponding control inputs to effect an emission of light from each device exhibiting substantially uniform intensity at the receiver when non-attenuated by the material and is responsive to the photoresponsive receiver output signals for deriving a time-based signal corresponding with the location of the edge.

Another feature of the invention provides a method for locating an edge of material which comprises the steps of:
providing an array of first to mutually spaced discrete light emitting devices disposed generally along an array axis, each device being responsive to the application of a drive current thereto to emit light;
positioning the array a select distance from one side of the material and at a location extending partially outwardly from the edge;
providing a photoresponsive receiver including a photodetector having a lengthwise photodetector axis and a length along that axis of at least about 9 cm;
positioning a photoresponsive receiver at a predetermined stand-off distance from the material, in light receiving relationship with the array, and oriented so as to position the photodetector axis in substantially parallel relationship with the array axis;
discretely energizing each light emitting device in a sequence between the first and last thereof by the application of the drive current thereto at a predetermined system frequency;
detecting with the photodetector the light emitted by the light emitting devices which is partially attenuated and non-attenuated by the material to derive output signals at the system frequency which exhibit amplitude data; and
correlating the amplitude data with time and location based data derived from the system frequency to derive a signal representing the location of the edge of the material.

Another feature of the invention provides, in a system for locating the edge of material wherein a linear array of a number of mutually spaced light emitting devices are positioned from first to last at a predetermined location spaced from the material and extending outwardly from the edge, the devices being energized in response to the application of drive current thereto to emit light of given intensity, and a photoresponsive receiver spaced from the opposite side of the material a predetermined distance from the linear array of light emitting devices and provides output signals of amplitudes varying with the intensity of emitted light modulated with respect to the attenuation thereof by the material, the method for optimizing the light emitting performance of the light emitting devices, comprising the steps of:
positioning the photoresponsive receiver substantially at the stand-off distance from the array;
determining an initial value for the drive current;
initially energizing each device with the initial value of drive current and deriving an output signal with the photoresponsive receiver corresponding with the intensity of emitted light of each device when detected by the receiver;
summing the derived output signals and dividing that sum by the number of light emitting devices to provide an average value thereof;
test energizing each device with a value of the drive current which has been adjusted by a predetermined increment value selected to effect a convergence of the value of the adjusted drive current with the average value;
deriving an output signal with the photoresponsive receiver corresponding with the intensity of emitted light of each device; and
reiterating the steps of test energizing each device and deriving an output signal until a set of final values of drive current are produced representing a select convergence between the derived output signals and an average value thereof.

Another feature of the invention provides a method for locating an edge of material which comprises the steps of:
providing an array of first-to-last discrete, light emitting devices, each device being responsive to the application of a drive current thereto to emit light of corresponding intensity;
positioning the array a select distance from one side of the material and at a location extending partially outwardly from the edge;
providing a photoresponsive receiver including a photodector;
positioning the photoresponsive receiver at a predetermined stand-off distance from the material, in light receiving relationship with the array;
discretely energizing each of the light emitting devices in a sequence occurring between the first and last thereof by applying, at a predetermined system frequency, a unique drive current thereto selected for generating the emitting light therefrom exhibiting a substantially constant amplitude at the receiver in the absence of attenuation by the material;
detecting, with the photodetector, the light emitted by the light emitting devices which is partially attenuated and non-attenuated by the material to derive output signals at the system frequency which exhibit amplitude data; and
correlating the amplitude data with time and location based data derived from the system frequency to derive a signal representing the location of the edge of the material.

Other objects of the invention will, in part, be obvious and will, in part, appear hereinafter.

The invention, accordingly, comprises the apparatus and method possessing the construction, combination of elements, arrangement of parts and steps which are exemplified in the following description.

For a fuller understanding of the nature and objects of the invention, references should be had to the following detailed description taken in connection with the accompanying drawings.

BRIEF DESCRIPTION OF THE DRAWINGS

FIG. 1 is a partial perspective view of apparatus according to the invention showing its employment in the edge detection of transparent material;

FIG. 2 is a sectional view taken through the plane 2—2 of FIG. 1;

FIG.3 is a sectional view taken through the plane 3—3 of FIG. 2;

FIG. 4 is a schematic ray trace showing the relationship of light emitted from an array of light emitting diodes with respect to a material edge and a single photodetector;

FIG. 5 is a representative curve developed from a sample and hold stage of control apparatus responding to illumination conditions represented at FIG. 4;

FIG. 6 is a representative curve showing an alteration of the curve shown in FIG. 5 following the passage of the signal representative thereof through a low pass filter;

FIG. 7 is a schematic ray trace showing illumination paths emanating from an array of light emitting diodes as affected by material being evaluated and with respect to a photodetecting arrangement according to the invention;

FIG. 8 is a representation of the output of a sample and hold stage of a control circuit responding to signals developed by the photodetecting array shown in FIG. 7;

FIG. 9 is a representative signal trace showing a curve evolved from the signal trace of FIG. 8 following the passage of the signal through a low pass filter;

FIGS. 15A-15C combine to provide a flow chart showing a program employing the apparatus of FIG. 14 to carry out the balancing of discrete diodes within an array thereof employed with the apparatus of the invention;

FIGS. 16A and 16B combine as labeled thereon to provide an electrical schematic diagram showing the components represented in FIG. 14 at an enhanced level of detail;

FIG. 19 is a representative signal trace employed in describing the output of the circuit of FIG. 18;

FIG. 20 is an idealized graph depicting the development of a material width datum with respect to the signal depicted in conjunction with FIG. 19;

FIG. 21 is a graph showing apparatus performance without the balancing and photodetecting improvements of the invention; and FIG. 22 is a graph showing the performance of apparatus according to the invention with the inclusion of both the LED output balancing feature and the expanded photodetector feature of the invention.

DETAILED DESCRIPTION OF THE INVENTION

Figure 10:
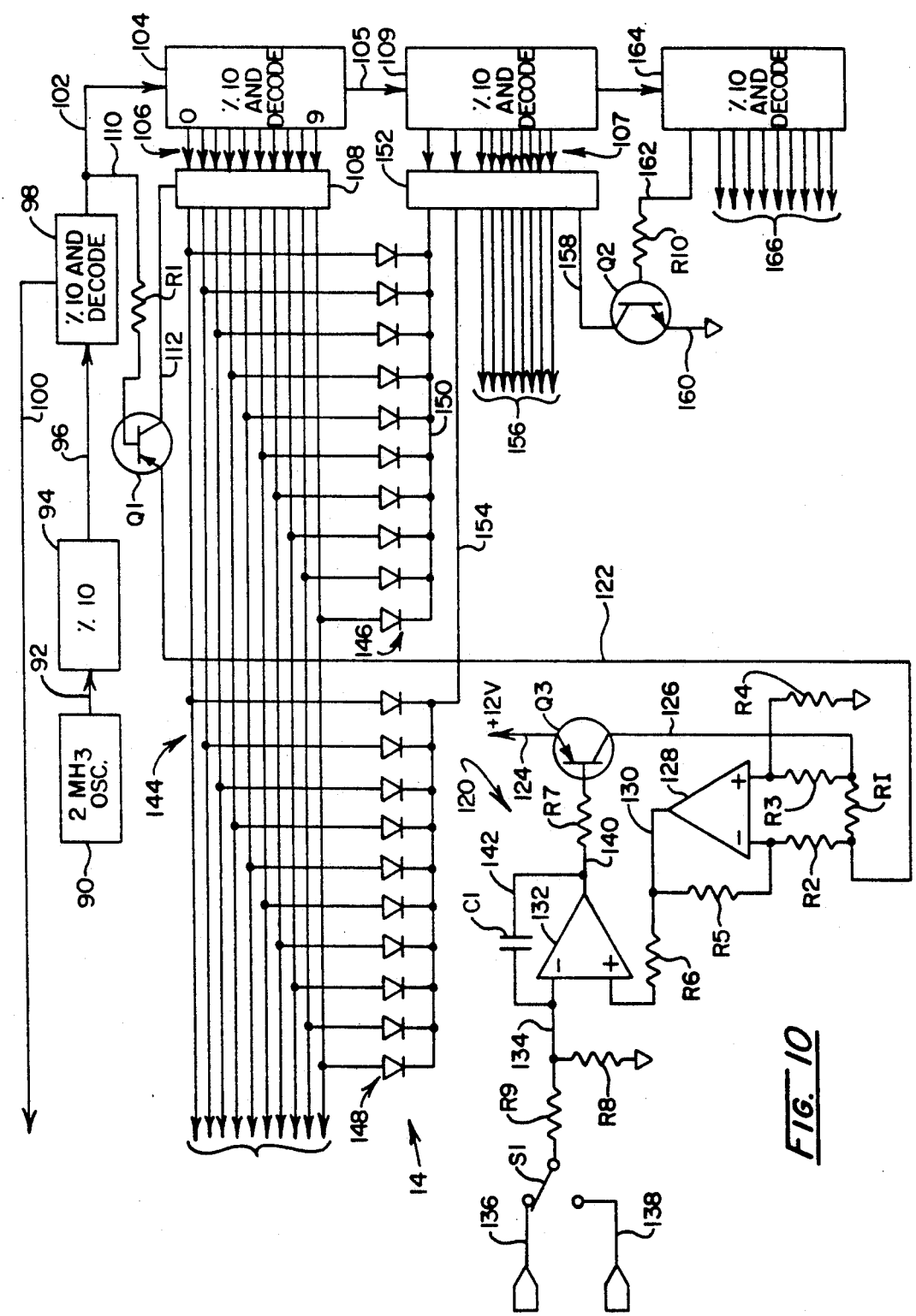
FIG. 10 is a schematic block diagram of a control arrangement for carrying out the illumination of the light emitting diodes of an array thereof employed with the apparatus of the invention.

In the discourse to follow, a typical industrial installation of the measuring apparatus employed with the invention is discussed, looking initially to the photoresponsive receiving function and the light emission characteristics associated with the apparatus. The discourse then turns to a description of the general circuitry by which the measuring apparatus carries out controlled light emitting diode illumination in generalized fashion followed by a discussion of the detailed circuitry involved with the emitter and receiver functions as heretofore utilized. The description then turns to the technique for developing controlled current based energization of the light emitting diodes both in general and more detailed fashion. Modifications to the receiving circuitry are then discussed which are employed to operate the system in the edge measurement of transparent and semi-transparent materials. Finally, performance curves comparing earlier performance of the system and apparatus with the performance improvements gained with the invention are described.

Referring to FIG. 1, an exemplary industrial application of the apparatus of the invention is revealed. Shown generally at 10, the apparatus includes a housing 12 which supports a linear array of light emitting diodes (LEDs) 14 at a location at one side, here the bottom side, of a continuously moving sheet of material 16, the width of which or edge positions of which at 18 and 20 are to be located. Note that the linear array of LEDs 14 extends beyond each of the edges 18 and 20. Additionally, the sheet material 16 is depicted as being transparent or semi-transparent and is supported upon conveyor rolls 22 such that its position with respect to the position of the array 14 is substantially fixed in a vertical sense. Conveyor rolls 22 are seen supported upon a support structure 24 and support structure 24, in turn, is seen to support a channel form, U-shaped receiver support 26. Support 26 includes a forwardly extending channel 28 which positions a photoresponsive receiver represented generally at 30 over the linear array of LEDs 14 and at its mid position. The stand-off height of the receiver 30 with respect to the linear array 14 preferably is twice the length of the linear array 14. However, in practice, that distance may vary depending upon manufacturing process constraints. The array 14 of LEDs will vary in length depending upon the edge location to be determined or widthwise extent of material to be determined or monitored and the array itself is formed of modular groupings of the LEDs, for example a module of 10 or as many as 101. These light emitting devices conventionally are positioned center-to-center, one-tenth of an inch apart and are individually sequentially energized to emit light for one-half cycle of a 20 KHz clock or scanning frequency. When the last or "Nth" LED in the array 14 has been lighted and extinguished, a reset signal is generated to begin the sequence again at the first LED of the array. This reset signal generally is referred to as the "sync pulse". As the individual LEDs of the array 14 are illuminated in scanning fashion and the illumination progresses from a non-attenuated outside region to a location adjacent the edge 18, or for example, are illuminated such that the illumination progresses from LEDs attenuated by the material 16 and extends across the edge 20, a variation in the peak intensity of emitted light for this scan region will be witnessed at the receiver 30. This variation in attenuation results in the generation of a "stairstep" form of waveform which is processed by low pass filtering to achieve a smooth curve. The mid point of this curve then is detected to evolve a time-based trigger pulse which may be employed by readout or control systems to determine the width between edges 18 and 20 of material 16 or the location of those edges. By improving this extrapolation procedure, an enhanced degree of locational accuracy may be realized.

Looking to FIG. 2, the receiver 30 is seen to include a rectangular housing 32 having an elongate rectangular opening therein at 34 along which a cylindrical, light gathering lens 36 is positioned. Above the lens 36, a circuit board as at 38 and a shield 40 are seen to be supported upon stand-offs 42 and 44 as seen in FIG. 3. Positioned above cylindrical lens 36 is a support board 46 which is seen in FIG. 3 to support three rectangular silicon solar cells 48-50 in a linear array. The cells may be provided, for example, as type 52PBHL produced by Applied Solar Energy Corp., or as Part No. 403-0242-0 marketed by Advanced Optoelectronics, Inc. of Los Angeles, Calif. Cells 48-50 are coupled in parallel and are in mutual adjacency. Each of the cells 48-50 has a lengthwise extent of 2 cm and, thus, as coupled in a grouping of three in the linear array shown the length of the photoresponsive components amounts to about 2.4 inches (6 cm). Heretofore, a singular solar cell as at 49 was provided for this function. However, substantially improved performance of the apparatus 10 has been witnessed by the addition of three of these cells developing the noted cell length. By contrast, the addition of still more cells in the linear array adds no additionally improved performance. This improved performance is considered to stem principally from the increased data made available in terms of the number of LEDs of the array 14 which are responded to as "seen" by the silicon detectors 48-50. Because of this, more data are available for the extrapolation carried out by the apparatus 10.

Looking to FIG. 4, a stylized ray trace is depicted demonstrating the earlier approach to photoreception by the edge locating devices wherein a singular, 2 cm long solar cell as at 49 has been employed. That cell is depicted in FIG. 4 at 53. Correspondingly, a linear array of 12 LEDs is depicted at 56. As before, these LEDs 56 will, in practice, be spaced at 1/10th of an inch on center. Intercepting the ray traces generated during a scan of the LEDs from location numbers or positions 1-12 is an opaque material 58 having an edge 60 to be located. The material 58 is positioned halfway between the LED array 56 and the silicon cell 53 in the interest of demonstration. As noted earlier herein, the material being edge evaluated will be in closer proximity to the array as at 56. Note, however, that a ray trace intermediate LEDs at the eighth and ninth position as at 62 will be "seen" by detector 53 with little attenuation occasioned by the edge 60 in material 58. A ray trace 64 drawn intermediate LED positions 6 and 7 is seen to strike the middle of detector 53 and will be partially attenuated by the materials 58 extending to edge 60. Finally, a ray trace 66 emanating from, for example, a location between LED positions 4 and 5 will be substantially obscured by the material 58 extending to edge 60.

Referring to FIG. 5, a staircase shaped curve representing the peak amplitudes detected at a sample and hold stage of a receiver incorporating a detector as at 53 is represented at 68. The curve relates the percentage of the maximum amplitude which can be witnessed by the photodetector 53 as occasioned by the effect of material 58 and edge 60. Note that the amplitude, for example adjacent LED 5 is quite low, while that adjacent LED 7 is quite high. In practice, the signal represented by curve 68 is submitted to a low pass filter which, in effect, draws a smooth curve through it. This curve is represented in a similar graph in FIG. 6. Looking to FIG. 6, the smooth curve 70 is seen to result from this filtering action with respect to curve 68 in FIG. 5. Circuitry of the measurement system 10 finds the mid point of this curve to, in turn, locate the time-based position of edge 60. Where the curve is steep as depicted, a lower level of edge detection accuracy is evolved.

Looking to FIG. 7, the geometric demonstration of FIG. 4 is repeated. However, for this demonstration, three photodetectors are employed. In this regard, detectors 52 and 54 are positioned on either side of detector 53 so as to emulate the corresponding detector array 48-50 described in conjunction with FIG. 3. An LED array is shown at 72 having a sequence of 12 LEDs 1-12. Light emanating from positions 1-12, depending upon the location of opaque material 74 and its edge 76 is unblocked, partially attenuated or obscured or fully obscured. In this regard, note that illumination emanating from LED position 12 as represented at ray trace 78 will be essentially totally obscured, reaching only the outer edge of detector 52. Correspondingly, illumination extending from LED position 6 as represented by ray trace 80 will, as in the case of FIG. 4, reach detector 53. Finally, illumination from an LED at station or position 1 as represented by ray trace 82 will be "seen" or detected essentially at its full peak amplitude by photodetector 54.

Turning to FIG. 8, the staircase curve representing the percent of maximum amplitude witnessed at the photodetector array 52-54 is shown at 84. As in the case of FIG. 5, this curve will have been evolved at a sample and hold stage of the receiver circuitry. Note initially the expanded number of data points represented by curve 84 and a resultant lowering of the overall slope of the curve 84. Where the signal represented by curve 84 is passed through a low pass filter stage, in effect, a smooth curve is drawn through it. Looking to FIG. 9, such a curve is represented at 86. Comparing curve 86 of this figure with curve 70 of FIG. 6, one may perceive the lower slope and, where the time based edge location is at 50% of the amplitude of this curve, one may perceive that a greater time based positional accuracy of the signal locating edge 76 is achieved. This accuracy is demonstrated in tests wherein a testing sample material with edge is passed very slowly and accurately along an LED array and receiver, and the variations of positional output as represented by a standard deviation computation are observed.

The curves of FIGS. 5, 6, 8, and 9 also reveal that the roughness of the resultant smooth curves 70 and 86 will also be dependent upon the uniformity of illumination amplitude achieved by the LEDs as measured at the receiver 30 under unobstructed conditions. Thus, improvement in accuracy also will be observed where that illumination can be made to be balanced. However, as demonstrated by FIGS. 7–9, by broadening the detector through the utilization of an array as a 48–50 more data points are achieved and the smooth curve evolved by low pass filtering becomes more accurate.

Referring to FIG. 10, a generalized block and schematic diagram of the time base and LED selection or multiplexing and driving components of the apparatus 10 are revealed. A quartz crystal oscillator represented at block 90 provides a stable 2 MHz output which is submitted as represented by arrow 92 to a divider represented at block 94. Divider 94 carries out a divide-by-10 function to provide a 200 KHz signal at line 96 which, in turn, is directed to another divide-by-10 network represented at block 98. The network 98 also carries out a decode function, for example 0 through 9, a select stage of which, for example the fourth output stage, is tapped as represented at line 100 to generate a video sample pulse which will occur substantially at the mid point of excitation of any given LED of the LED array 14. The carry output of network 98 is tapped at line 102 to provide a system frequency 20 KHz signal which is directed to the input of a units decoder represented at block 104. With the arrangement shown, the outputs 0 through 9 of decoder 104 at line array 106 will be activated in sequence at the noted 20 KHz frequency. The lines of array 106 are directed to a corresponding array of buffer transistors represented at block 108 which, in turn, receive LED excitation current through PNP transistor Q1. Note in this regard, that the base of transistor Q1 also is coupled through base resistor R1 and line 110 to line 102 carrying the base 20 KHz signal input to units decoder 104. The collector of transistor Q1 is coupled via line 112 in common to the corresponding collectors of the buffer transistors at array 108. Transistor Q1 functions to supply energizing or drive current to the diodes of array 14 and, in accordance with the invention, it does so on a discrete diode-by-diode basis wherein the level or value of that current is pre-selected to achieve the noted desired balance of illumination intensity at the receiver unit 30. Thus, transistor Q1 is located at the output of a drive network represented in general at 120. In this regard, note that the collector of transistor Q1 is coupled via line 122 to the current output of a voltage-to-current converter function of network 120. Current drive to each discrete diode of the array 14 is modulated or controlled from a PNP transistor Q3, the collector of which is coupled via line 124 to +12 v supply. The collector of transistor Q3 is coupled by line 126 to a reference resistor RI, the opposite side of which, in turn, is coupled to line 122. As current is supplied from line 126, a voltage will be developed across the reference resistor RI. This voltage is witnessed at the input of an operational amplifier 128. In this regard, the opposite sides of resistor RI are coupled through resistors R2 and R3 to the respective negative and positive inputs of amplifier 128. Resistors R2 through R4, as shown generally, are of equal value to produce a unity gain at amplifier stage 128. The output of device 128 at line 130 is directed in feedback fashion to the positive input of an operational amplifier 132. A predetermined voltage level which is specific to each LED of the array 14 is applied to the negative input of amplifier 132 via line 134. Gain or range is adjusted by resistors R8 and R9 coupled with line 134. The predetermined voltage level input is depicted as developed from a memory driven digital-to-analog converter and asserted from line 136. Correspondingly, similar digital-to-analog converter generated voltage is provided at line 138 during the balancing exercise carried out with respect to each apparatus 10. Typically, a jumper is employed for the function of switch S1. Thus, as a voltage level is applied from line 134 to the amplifier 132, it will adjust its output at line 140 to achieve a balance in voltage between lines 130 and 134. Note that line 140 extends through base resistor R7 to the base of transistor Q3. Accordingly, for each discrete LED, a specific drive current is evolved. A capacitor C1 within line 142, which extends from line 140 to line 134, serves to prevent parasitic oscillations, as well as to evolve a band pass in the 20 KHz range for the device 132. The monitored and controlled current applied via line 122 to transistor Q1 then, in turn, is applied to the elected transistor buffer stage at array 10 in conjunction with each positive going half cycle of the 20 KHz signal at line 102.

With the arrangement shown, drive current is applied from transistor Q1 at a 50% duty cycle to the buffer transistors of array 108 which, in turn, selectively, in sequence, energize the leads of a units bus 144. Each of the leads of bus 144 are coupled with a discrete module formed as an array of, for example, 10 light emitting diodes (LEDs), a first such array being represented in general at 146 and a second being represented in general at 148. Note that the anodes of each such LED are coupled with a corresponding lead of bus 144 and the cathodes thereof are commonly connected. In this regard, the cathodes of LED array 146 are connected by line 150 to an array of buffer drivers 152. Similarly, the array of LEDs 148 are coupled via line 154, to a next succeeding output of the buffer array 152. Lines 150 and 154 as well as an additional array of eight leads shown at 156 may be connected to succeeding modules of 10 light emitting diodes to provide for their selection by enablement through the buffer array 152. Sequential enablement is derived by a divide-by-10 counter and decoder 109, the input to which is driven at 2 KHz from line 110 representing the carry output of decoder 140 and the output of which is at lead array 107. Thus, up to 100 diodes may be selected. Where the array of LEDs 14 contains more than 100 LEDs, then a hundreds selection procedure is carried out by select enablement of buffers as at array 152 via the activation of NPN transistors as shown at Q2. This enablement to buffer 152 is represented at line 158 extending to the collector of transistor Q2. The emitter of transistor Q2 is coupled to ground via line 160, while the base thereof is coupled through base resistor R10 and line 162 to the zero output of another divide by 10 decoder represented at block 164. Thus, the array 14 may be expanded to larger size in a modular fashion, an appropriate output of decoder 164 providing a hundreds value enablement. Hundreds selection is carried out by appropriate jumpering to transistors such as that at Q2 via the decoder output line array, the additional outputs of which are represented at array 166.

Figure 11:
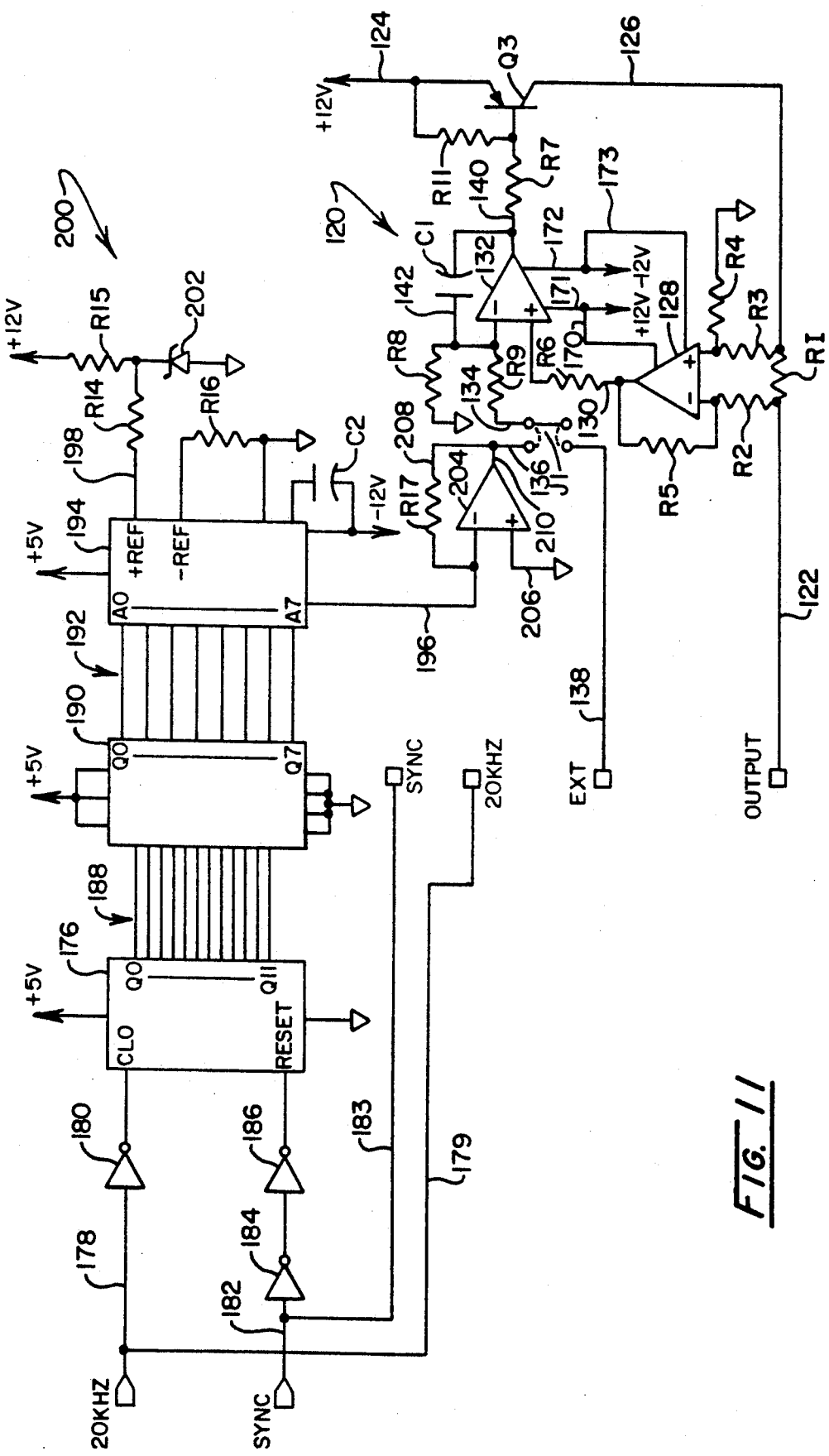
FIG. 11 is an electrical schematic diagram showing components carrying out a select energization of the discrete diodes of a light emitting array employed with the apparatus of the invention to accomplish a balanced intensity output thereof with respect to a remote photodetector.

Turning to FIG. 11, the driver network 120 again is presented with the same numeration and component identification provided in conjunction with FIG. 10. In this more elaborate representation, an additional resistor R11 is seen to be provided between the base of transistor Q3 and line 124, and amplification stages 132 and 128 are seen to be coupled to +12 v and −12 v supply at lines 170-173. Amplifier stage 128 may be, for example, a type LF356, while stage 132 may be provided as a type LF353. The amount of voltage at the positive input of amplifier stage 132 will determine the current flow from transistor Q3 and across resistor RI. Values for that voltage are stored in erasable, programmable read only memory (EPROM) or battery backed random access memory at addresses, for example, 0 through N, where N equals the number of LEDs within array 14. Control input for developing these discrete current values includes a 12-bit binary counter 176 which may be provided, for example, as a type 4040. The clock input to counter 176 is the base scanning or system clock, for example as described at FIG. 10 in connection with line 102. This 20 KHz input is seen provided at line 178 which incorporates an inverter buffer 180 and is directed to the clock, CLO, terminal of counter 176. In similar fashion, a sync pulse which is developed at the conclusion of illumination of the last diode of the array 14 and is associated with all logic of the apparatus 10, is asserted from line 182 which incorporates two inverting buffers 184 and 186, and is directed to the reset input of counter 176. Corresponding 20 KHz and sync inputs to lines 178 and 182 are provided as alternate inputs at respective lines 179 and 183. Counter 176, responding to the 20 KHz input at line 178, will provide successive binary address values at its 12-bit output seen coupled to 12 lead array 188. Accordingly, a unique address value is associated with each LED in the array 14 and is developed in synchronism with the activation of those LEDs. Array 188 is coupled with the address inputs of a type 2764 erasable, programmable read only memory (EPROM) 190. At each LED related address, an 8-bit word will be stored representing the correct current value for balanced light emission to receiver 30. Accordingly, in response to a synchronized address input from array 188, EPROM 190 presents an 8-bit word at its Q0-Q7 outputs, seen coupled to lead array 192. Array 192 is coupled to the A0-A7 inputs of a digital-to-analog converter (DAC) 194, the analog voltage output of which is provided at line 196. Device 194 operates in conjunction with a +5 v reference applied from line 198 which is connected with a voltage reference network 200 including resistors R14 and R15 connected with +12 v supply and a small, integrated voltage reference circuit provided, for example, as a type LM336 and represented by the symbol 202. The minus reference terminal of device 194 is coupled to ground through a current limiting resistor R16. Additionally, the device 194 is configured in conjunction with a capacitor C2. With the configuration shown, the voltage at line 196 will represent the reference voltage of 5 v multiplied by the value of the 8-bit word asserted from memory 190, in turn, divided by 255. This output, as asserted at line 196 is directed to the negative input of a buffer amplifier 204, the positive input to which is coupled to ground via line 206 and incorporating a feedback path 208 including resistor R17. Buffer amplifier 204 may be provided, for example, as a type LF353. The output of buffer 204 at line 210 is directed to earlier-described input line 136 to amplifier stage 132. A jumper identified at J1 serves the function of earlier-described switch S1 providing for a computer derived input at line 138 for purposes of LED balancing or optimization procedures.

It may be observed from the above description of FIG. 11 that the development of an LED specific excitation current for each of the arrayed LEDs is carried out in an ideally low cost, simple manner. No microprocessor driven controls are involved, synchronized development of these drive currents being evolved with the three components 176, 190, and 194.

Figure 12:
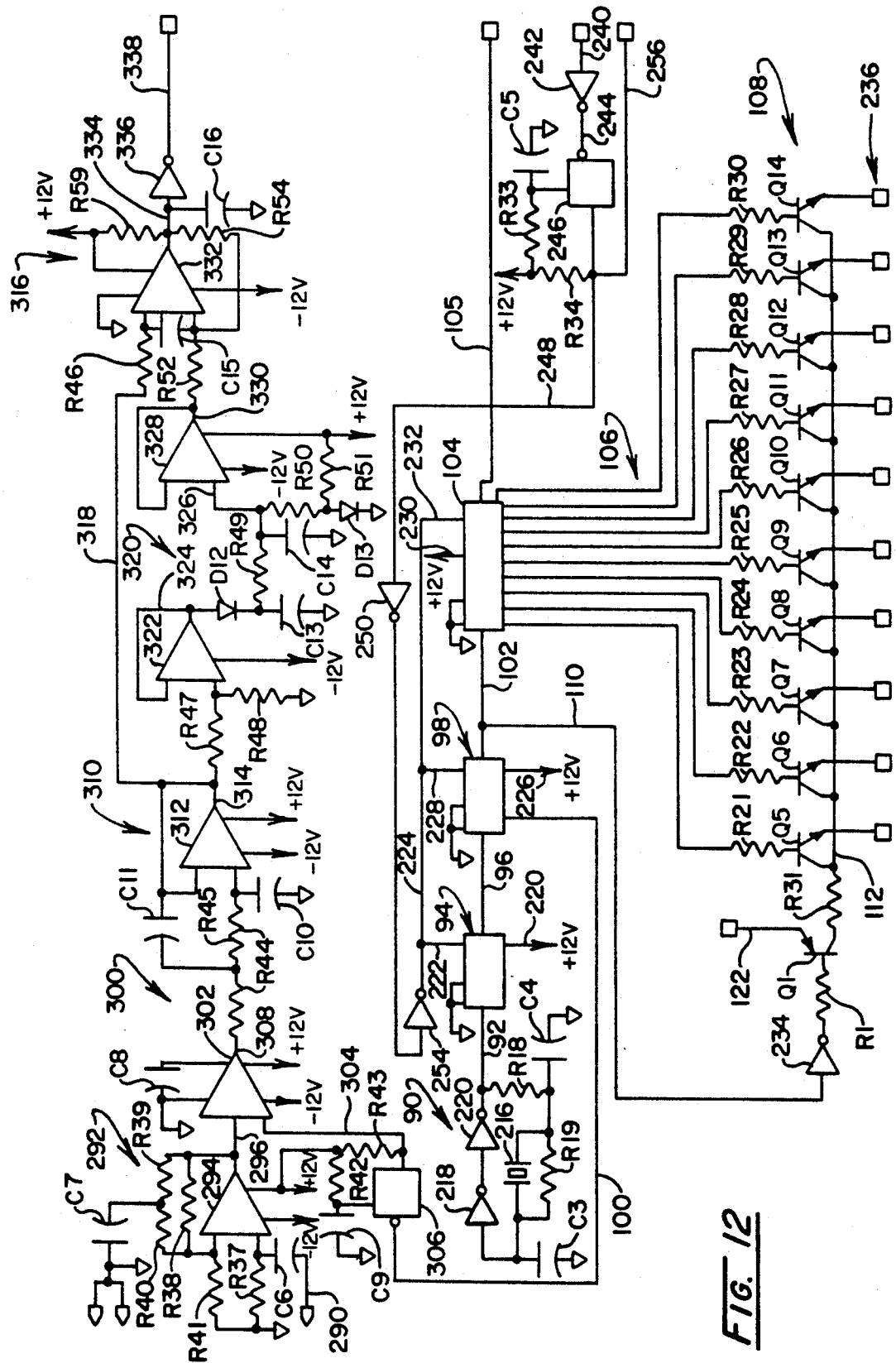
FIG. 12 is an electrical schematic diagram showing the timing function and photodetector signal output treatment function of the apparatus of the invention.
Figure 13:
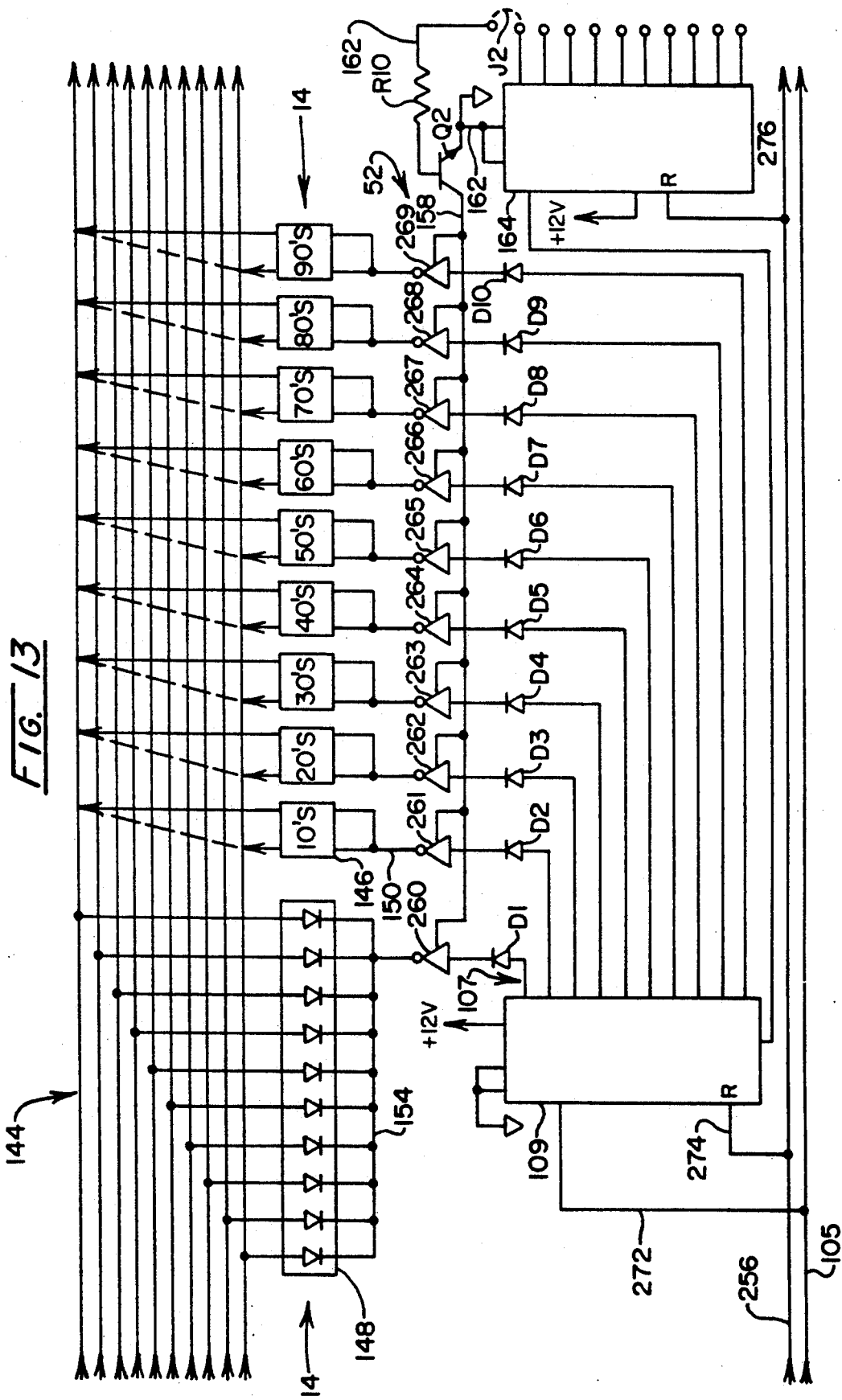
FIG.13 is an electrical schematic diagram showing multiplexing techniques for the selection of individual diodes within arrays thereof employed with the apparatus of the invention.

Referring to FIGS. 12 and 13, the time base and multiplexing or LED selection function, as well as video processing functions are revealed at an enhanced level of detail. In the figures, functions earlier identified in block diagrammatic manner in connection with FIG. 10 are generally identified by the same numeration.

Looking to FIG. 12, the 2 MHz oscillator stage 90 again is represented by that numeration and is seen to include a quartz crystal 216 which is configured to operate in conjunction with two inverting buffer stages 218 and 220 which perform with crystal 216 in a conventional oscillator structure including resistors R18 and R19 and equal value capacitors C3 and C4. The resultant 2 MHz squarewave output, with a 12 v peak-to-peak signal strength is then fed to the input of divide-by-10 stage 94. Stage 94 is coupled to +12 v supply via line 220 and its reset input is coupled to lines 222 and 224. Provided, for example, as a type 4017 device, the output of divider 94 at line 96 is at a frequency of 200 KHz and is directed to the input of a next, type 4017 divide-by-10 and decoder device 98. A stage of device 98 is tapped, as above described, by line 100, to provide a signal corresponding with the center of the peak amplitude of an LED light output to be sampled. For example, line 100 may be coupled with the fourth decoder stage of device 98. Decoder 98 is coupled to +12 v through line 226 and its reset input is coupled to line 224 through line 228. The divided output of device 98 is provided at line 102 which will exhibit a system frequency of 20 KHz and is directed to the input of units decoder 104 serving also as a divide by 10 device. Decoder 104 is coupled with +12 v at line 230 and its reset input is coupled to line 224 through line 232. Units decoder 104 will respond to the 20 KHz input from line 102 and selectively activate the 10 leads of 10 lead array 106. The leads of array 106, in turn, are directed through base resistors R21-R30 to the base electrodes of NPN buffer transistors Q5-Q14. The collectors of transistors Q5-Q14 are commonly connected to line 112 which extends through resistor R31 to the collector of transistor Q1. The base of transistor Q1 is coupled through base resistor R1 and inverting buffer 234 to line 110. Correspondingly, the emitters of transistors Q5-Q14 are coupled to earlier-described units bus 144 through the connectors of connector array 236. Device 234 may be provided, for example, as a type 4049 buffer. Thus, upon a buffer transistor from the array Q5-Q14 being activated, there synchronously will be provided a select LED derived current from transistor Q1 and line 122. This light generating current is provided at each half cycle such that there is a distinct turning on and turning off of the LEDs of array 14. Thus, the 20 KHz time base functions to pulse the LEDs such that the detection of the light emitted therefrom can be appropriately detected and isolated from impulsed light or light pulsed at some other frequency.

The divided-by-10 output of decoder divider 104 is provided at line 110. This 2 KHz output at line 110 is a signal to be sent to successive divide by 10 stages in LED driver circuits. Resetting occurs in consequence of a reset input applied at line 240 through an inverting buffer 242 and line 244 to the input of a one-shot multivibrator 246. Device 246 may, for example, be a type 558 and generates a reset pulse of configuration and duration established by capacitor C5 and resistor R33. The reset input at line 240 is generated at the termination of one scan of the entire LED array 14. For example, if the array is comprised of 400 LEDs, following the illumination of the 400th diode number 400, the reset or sync pulse is generated. This pulse is utilized at line 248 to reset devices 94, 98, and 104 by application of the reset pulse through inverter buffer 250, line 252, inverting buffer 254, and earlier-described line 224. Additionally, all counters employed within the apparatus 10 are set by this master reset or "sync" signal indicating the termination of one scan of array 14 and the commencement of another as represented by connection to line 256.

Looking momentarily to FIG. 13, diode bus 144 again is reproduced and the units LED array 148 shows that the individual LEDs are coupled to a select one of the leads of bus 144. The cathodes of these LEDs, as before, are coupled to line 154 which, in turn, is coupled to the output of an inverter buffer 260 of the inverter buffer array 152 including inverter buffers 260-269. The output of buffer 261 at line 150 is shown to be coupled to the cathodes of the diode arrays of the next decade of light emitting diodes of the array 14. Identified as the "10's" module, this grouping of LEDs has been described in connection with FIG. 10 at 146. Similarly, sequential decades of the diodes labeled as "20's" through "90's" are represented symbolically and are coupled to the outputs of respective inverting buffers 262-269.

Buffers 260-269 are activated from divide-by-10 divider and decoder 109 which is clocked from lines 105 and 272 with the 2 KHz clock signal earlier described in conjunction with the output of units decoder 104. Accordingly, upon the occurrence of decade selecting pulses at line 272, the leads of output array 107 will be sequentially activated with a positive going pulse through appropriate diodes of diode array D1-D10 to, in turn, cause a selected buffer inverter 260-269 to provide a logic low at its output. Decoder 109 is reset from lines 256 and 274, the latter line carrying the earlier-described system reset output of device 246 described in connection with FIG. 12.

A condition is asserted upon the activation of select inverters within array 152. That condition is developed through transistor Q2, the collector of which is coupled via line 158 to the inverters of the array 152 thereof. The base of transistor Q2 is coupled through resistor R10 to a select "hundreds" output of divider and decoder 164. Thus, a zero output connection is represented by jumper J2. Should a next sequence of 100 diodes be incorporated in the apparatus 10, then the jumper would extend from line 162 to the next output of decoder 164. The reset input of device 164 is coupled to earlier-described master reset line 256 through line 276.

Returning to FIG. 12, the video signal deriving from parallel coupled photodetectors 48-50 will have been pre-amplified at a balanced pre-amplifier stage and is then directed as represented at line 290 and coupling capacitor C6 to one input of a tuned amplifier stage represented generally at 292. Stage 292 includes an operational amplifier 294 having one input receiving a.c. coupled signal in conjunction with resistor R37. As a consequence of this arrangement, a differentiation of the input occurs. This provides a filtered avoidance of interference, for example, from 60 Hz or 120 Hz plant illumination. The output of amplifier 294 is provided at line 296 and is associated with a feedback path including resistors R38 through R41 as well as a capacitor C6 which is coupled to ground. This feedback arrangement creates another corner involving diminishing gain for lower frequency signals while enhancing higher frequencies. The frequency response of operational amplifier 294 itself falls off, for example at about 50 KHz at a gain of 100. As a consequence, circuit gain is minimized above the desired 20 KHz sought to be detected. The amplifier 294 additionally is coupled to −12 v and +12 v as labeled and may be provided, for example, as a type LF356. The output of the tuned stage 292 is directed to the input of a sample and hold amplifier stage represented generally at 300 and including a type LF398 integrated sample and hold amplifier operating in conjunction with capacitor C7. Device 302 may be provided, for example, as a type LF398 and the sample pulse input thereto is provided at line 304 which, in turn, is connected to the output of a one-shot multivibrator 306. Provided as a type 558, the device 306 is actuated from line 100 representing a stage of decoder 98 selected to cause the sampling of the intensity of each LED of array 14 as the output reaches its peak intensity. The pulse width of the output of device 306 is determined by the R-C network including capacitor and resistor R42. That network is seen to be coupled to +12 v. Amplifier 302 additionally is seen to be coupled, as labeled, to +12 v and −12 v supply and its output at line 308 will resemble the staircase curves described in conjunction with FIGS. 5 and 8 when appropriate components of the LED array 14 have located an edge. Otherwise, assuming a balancing of the outputs of the LEDs with respect to receiver 30, a d.c. level will be observed. Output line 308 is seen directed to a low pass filter stage conventionally configured with an operational amplifier 312, resistors R44 and R45, and capacitors C10 and C11. Device 312 may be provided as a type LF356 and is seen coupled to +12 v and −12 v supply. The stage 310 functions to, in effect draw a smooth curve through the staircase signal which may appear at output line 308 and the signal representing this smooth curve as described in conjunction with FIGS. 6 and 9 is present at line 314.

The smooth curve characteristic output at line 314 is directed to two stages. One stage is a comparator stage represented generally at 316 which receives the noted signal via lines 314 and 318 within which resistor R46 is incorporated. The other input is to a threshold defining network represented generally at 320 which, for the case of the detection of the edge of an opaque material, finds a voltage level representing 50% of the peak amplitude detected. By contrast, where transparent or semi-transparent materials are edge evaluated, then what will be sought is the mid-point between maximum and minimum amplitudes. For the opaque material edge location case, the output at line 314 of stage 310 is seen directed to one input of an operational amplifier 322. Device 322 may be provided, for example, as a type LF353. This input is attenuated, for example, by 9% in consequence of the positioning of resistors R47 and R48 to effect balancing of subsequent diode drop offset created by D13. The output of amplifier 322 at line 324 is fed back to its opposite input to create a voltage follower structuring, and is asserted through diode D12 to be divided by the combination of resistors R49 and R50. Stabilizing capacitors C13 and C14 are coupled to ground in association with resistors R49 and R50. To assure that a minimum signal value will be present, a diode D13 is connected between resistor R50 and ground. Additionally, the anode of diode 13 is coupled to +12 v through resistor R51 for this noted minimum excursion purpose. The resultant threshold level or triggering level output is provided at line 326 which is directed to one input of a buffering operational amplifier 328, the output of which at line 330 is coupled to its opposite input, as well as through resistor R52 to the positive input of operational amplifier 332 of comparator stage 316. A capacitor C15 is connected between these two inputs. The output of the comparator 316 thereof at line 334 is seen to be coupled through resistor R53 to +12 v and through resistor R54 to its positive input. The output of comparator amplifier 332 is an open collector transistor stage and this collector line 334 is pulled high through resistor R59. Some of the output signal at line 334 is fed back to the non-inverting input of device 332 through resistor R54. This signal introduces hysteresis to the input causing rapid switching of the output stage and better noise immunity. With the arrangement shown, when the smooth waveform asserted through resistor R46 to the input of device 332 drops below the voltage reference supplied through resistor R52, the output of device 332 at line 334 will abruptly switch from 0 to 12 v and will quickly return to 0 v as the diode array is illuminated well beyond the edge sought to be located or detected. The edge location output then is directed through inverting buffer 336 to video output line 338 for appropriate processing to develop material width, edge location, or like data. A stabilizing capacitor C16 is seen coupled between line 334 and ground.

Now considering the technique by which the values or current level are derived for ultimate storage within EPROM 190, a computer program in combination with supporting interface circuitry and a computer are employed. Looking to FIG. 14, the noted interface circuitry or supporting hardware are represented in block diagrammatic form. The circuit shown in the figure employs the pre-amplified video signal described in conjunction with line 290 in FIG. 12. This line is reproduced in FIG. 14 as introducing that signal to a video amplifier stage represented at block 340. Amplifier 340 is structured substantially the same as stage 292 described in FIG. 12 and is tuned having a band pass centered on the noted 20 KHz LED pulsing or system frequency. The output of stage 340 at line 342 is directed to a limiter circuit represented at block 344. Circuit 344 limits the voltage excursions of the signal 342 for purposes of protecting a next positioned analog-to-digital converter stage. In this regard, the output of circuit 344 at line 346 is directed to an analog-to-digital converter stage represented at block 348. Stage 348 receives the signal from limiter 344 which represents the positive one-half cycle of each video pulse. When triggered or activated to sample, the stage 348 will convert that analog signal into an 8-bit digital word and present it along lead array or bus 350 which is directed to a port designated as "port B" of a computer employed with the instant process.

Converter 348 is instructed to sample in response to a command input at line 354 from a gate 356. One input to gate 356 emanates from line 304 or the sampling pulse asserted at the sample and hold stage 300 as described at FIG. 12. The same line numbering 304 is employed in the instant figure. The opposite input to gate 356 at line 358 is developed from the equality port or A port=B port output of a 12-bit binary magnitude comparator represented at block 360. This gate input at line 358 serves, in general, to elect that LED of the array 14 which is to be evaluated. The A port of magnitude comparator 360 is coupled via 12-lead bus 362 to a 12-bit binary counter represented at block 364. The inputs to counter 364 are a reset signal at line 366 from the computer employed with this procedure and an LED clock at the noted 20 KHz emanating, however, from that same computer which is introduced at line 368. The B port input to binary magnitude comparator 360 is coupled to 12 lead bus 370 which extends to another 12 bit binary counter represented at block 372. Counter 372 is reset to signal the commencement of illumination of the first LED from the system reset signal of apparatus 10 as emanating from line 256 described in conjunction with FIG. 12 or, alternately at line 183 as described in conjunction with FIG. 11. In the instant figure, the line is identified at 374. The clock input to counter 372 is the system clock signal at 20 KHz as described at line 102 in FIG. 12 or at line 179 in FIG. 11. This input is identified as a line 376 in the instant figure.

With the apparatus 10 assembled with LED array 14 positioned in predetermined stand-off distance or spaced relationship from the receiver 30, inputs may be asserted to counter 372 from apparatus 10 and simultaneously to the video amplifier 340. The computer employed with the balancing procedure may then select any given diode by application of appropriate count signals to the counter 364. The resultant output at port A of magnitude comparator 360 is then compared with the binary value asserted from apparatus 10 itself to port B of the comparator through bus 370. In an event of coincidence between the binary value at port A with port B, a condition of A=B exists and a gating signal becomes available at line 358 which upon the occurrence of the apparatus 10 sampling pulse at line 304, enables or instructs A/D converter 348 to convert a sampled amplitude of illumination to an 8-bit word, which then is submitted to port B of the computer as represented at block 352.

It may be noted that bus 370 also addresses a static random access memory (RAM) as represented at block 378. The read/write command to RAM 378 is developed from the noted computer and provided at line 380. Thus, where a particular LED has been selected for evaluation by the computer, the static RAM 378 will have received that same address value at which time it may be commanded to write on its 8-bit I/O databus 382 the 8-bit word or value stored at that address. Accordingly, as the LED array 14 is scanned, each LED that is scanned has a specific address corresponding to it in static RAM 378 and a corresponding 8-bit word at that address that represents or has a value corresponding with the drive current selected for that diode. The computer can also read or write to static RAM 378 by a suitable command at line 380 provided in conjunction with an input from it at its bi-directional 8-bit port, herein designated "port A" through a bi-directional bus buffer chip as represented at block 384. In general, it will be seen that an arbitrary value is assigned at the commencement of a balancing process. As the outputs of the LEDs then are evaluated, that value is incremented or decremented from the computer at its designated port A at block 384. The resultant incremented drive current value then may be submitted by bus 382 to the digital-to-analog converter represented at block 386. Converter 386 then may convert the binary value for drive current to an analog d.c. level for presentation along line 138. Looking momentarily to FIG. 11, line 138 is seen to be directed to jumper J1. For the balancing process, jumper J1 is arranged to connect line 138 with line 134 such that a drive current may be evolved at line 122 corresponding with the analog input at line 138. The computer employed in conjunction with the components of FIG. 14, i.e. supplying inputs as well as providing port A an port B may be selected to suit the individual requirements of the user. However, a Vitrax IX single board computer incorporating a 64180 microprocessor marketed by Aries Corporation has been employed in conjunction with the balancing components and software described herein.

Figure 14:
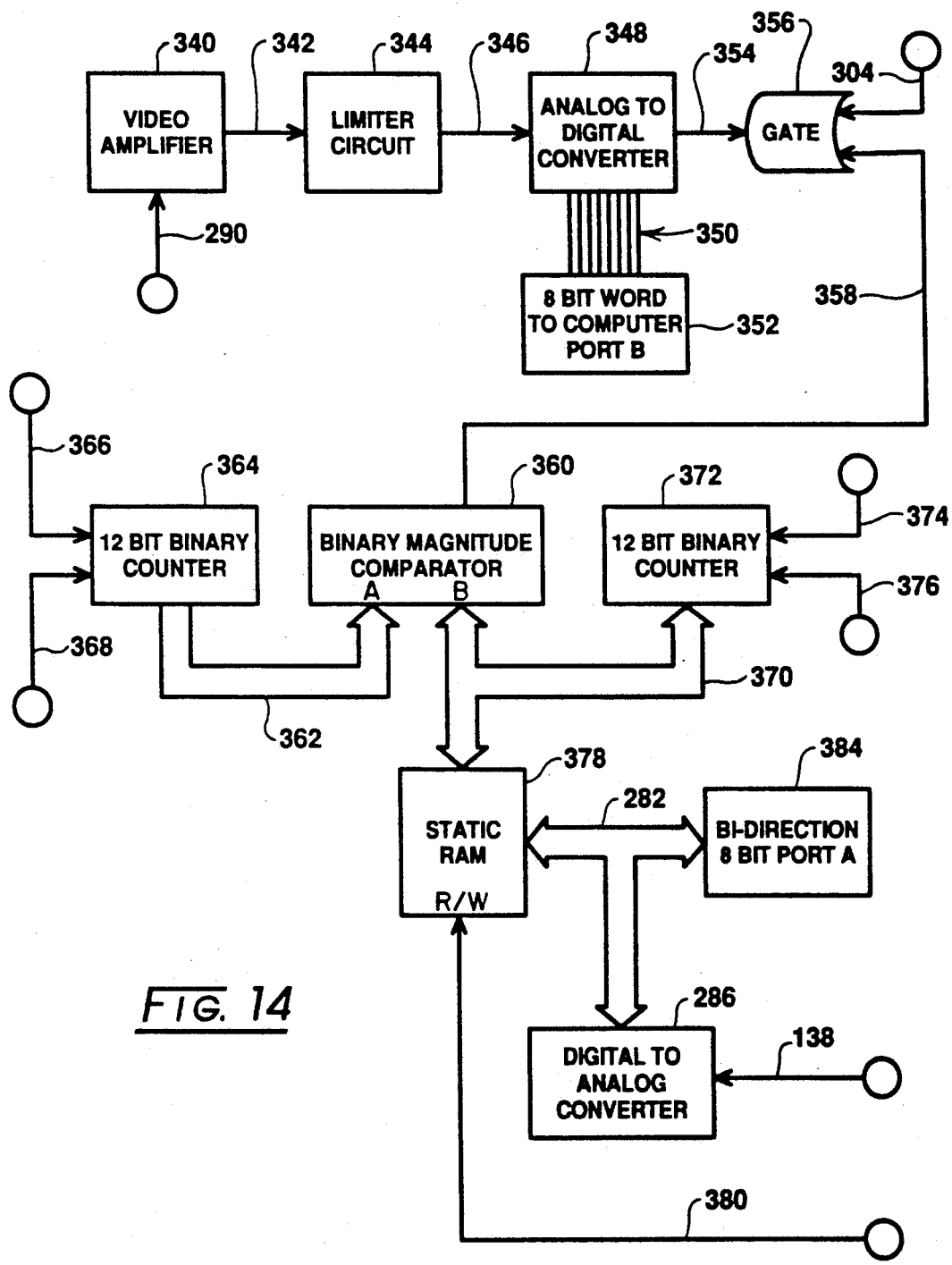
FIG. 14 is a block schematic diagram showing interface components employed in a system for carrying out the balancing of the diodes of an array thereof employed with the apparatus of the invention.
Figure 15B:
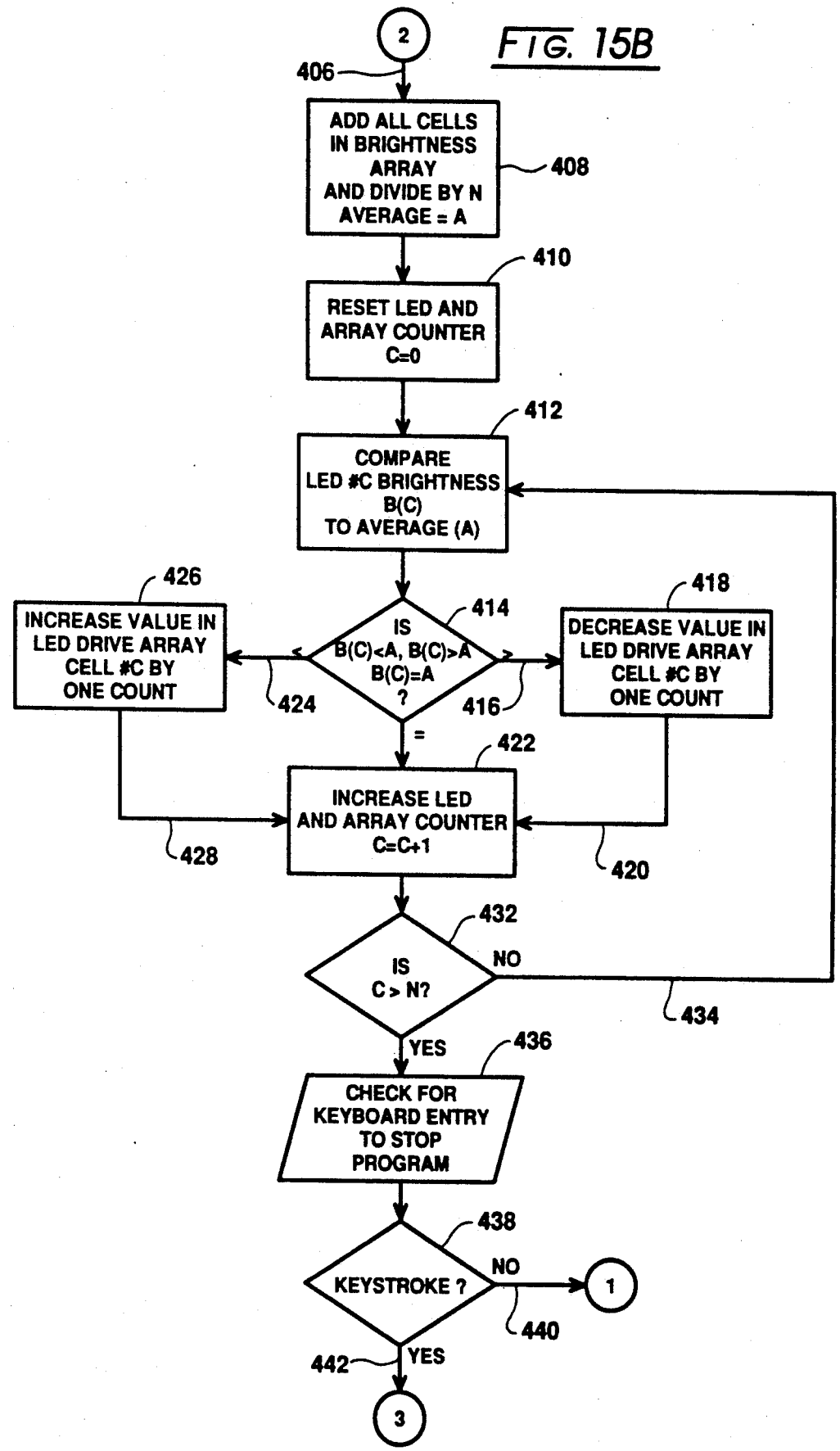

The software program under which balancing of the LED array 14 is carried out is described in conjunction with FIGS. 15A–15C which are mutually associated by the numerically identified nodes positioned thereon. Looking to FIG. 15A, the program is seen to start at node 390 and, as represented at block 392, the program asks the operator to input the number of LEDs of the array 14 which are to be balanced. This number is represented as "N". Then, as represented at block 394, the program dimensions a numerical array in the program which is N cells long. The first such array is to store the brightness values of the discrete LEDs under evaluation. The next array designated D(N) is dimensioned having N cells. The cells of this array are filled with an arbitrary brightness number which resides somewhat intermediate the lowest value of brightness and the highest. That highest value will, for example, be 255. The arbitrarily elected value, for example 160, will be incremented or decremented as the balancing process ensues. Thus, the arbitrary value initially elected is one low enough to be incremented sufficiently and high enough so as to be decremented sufficiently where necessary. Accordingly it is heuristically elected. The program then progresses to the procedure set forth at block 396 wherein an LED counter is set to zero. This counter value is designated as "C". Next, as represented at block 398, the brightness of a counter elected LED is read, for example, providing a signal at line 290 described in FIG. 14, and the brightness value thereof is stored in the noted first array, herein designated as "B(C)". The counter then increments to the next LED as represented at block 400 and, the inquiry represented at block 404 is made to determine whether the counter value is greater than N, representing a completion of the array. In the event of a negative determination, then as represented by line 404, the instructions at block 398 are carried out, brightness being read and the value thereof stored. In the event of an affirmative determination at block 402, then as represented at line 406 and node 2, the program proceeds as represented in FIG. 15B. Looking to that figure, line 406 is seen being directed to the instructions at block 408. These instructions provide for the addition of the brightness values in all of the array cells and the division of them by the number of LEDs or cells, N, to find an average value which is designated "A". Next, as represented at block 410, the LED and array counter is reset to zero and, as represented at block 412, the program commences to compare each discrete LED brightness as elected by counter C and as located in the noted first array, B(C), to the average brightness, A. The program then proceeds to the inquiry set forth at block 414. If the LED under investigation is brighter than average, then a function is carried out wherein the value in the LED drive array is decremented by a predetermined count or number. That count or number is herein elected as one count, however, other increments may be chosen. Thus, if this were the first iteration with an arbitrary brightness reflected as 160, the brightness value for the LED under investigation would now be 159. Accordingly, as represented at line 416 and block 418, where the brightness value, B(C), is greater than A, the value in the LED drive array is decreased for the cell and LED under investigation by one count. The program then proceeds as represented line 420 and block 422. At block 422, instructions are provided for increasing the LED and array counter or incrementing it by a value of 1.

Returning to block 414, where the brightness value within the brightness array is less than the average value, A, then as represented by line 424 and block 426, the value in the LED drive array for the cell or LED under consideration is increased or incremented by an arbitrary value, herein shown to be 1 count. The program then proceeds as represented at line 428 and block 422 wherein the array counter is incremented by 1. Where the brightness value equals the average value of brightness, then as represented at line 430, the program proceeds to the incrementation step at block 422. Following this incrementation, as represented at block 432, a determination is made as to whether all cells have been examined for this iteration of the program. In the event of a negative determination, then as represented at line 434, the program returns to the comparison step at block 412. This looping procedure will continue through, for example, 20 or 30 iterations. In the course of this activity, the operator may, for example, be observing waveform improvements on an oscilloscope, a series of sinewaves at 20 KHz being observed. Also, it is helpful to compute the maximum LED brightness which has been read and the minimum LED brightness read as well as the average LED value. As the operator observes these readouts, their convergence can be noted. As the operator determines that appropriate brightness values for the LEDs has been achieved, the above adjustment portion of the program can be terminated by an appropriate keyboard entry. Thus, as represented at block 436, a check is made as to whether a keyboard entry to stop the program has been made. Then, as represented at block 438, where the operator has determined to permit the program to continue, as represented at line 440 and node 1, the program returns to block 396 wherein the LED counter is set to zero and the above sequence of steps again is performed.

In the event that the operator has determined that appropriate convergence and thus, an adequate balancing of LED intensities has been achieved, then as represented at line 442 and node 3, the program proceeds to the instructions at block 444 shown in FIG. 15C. Block 444 provides for setting the array counter to zero in commencement of loading the LED current drive values into EPROM 190 as described in conjunction with FIG. 11. Accordingly, as represented at block 446, the value in the LED drive array, D(C) for address C is stored in the EPROM 190. Then, as represented at block 448, the LED array counter is incremented by 1, whereupon, as represented at block 450, a determination is made as to whether values for the entire array of LEDs have been stored. In the event they have not, the program loops as represented at line 452 to recommence the storage activity represented at block 446. In the event of an affirmative determination at block 450, then as represented at line 454 and node 456, the balancing program is concluded.

It may be observed from the foregoing that the adjustment to LED drive current is made with respect to light intensity amplitude at receiver 30, not at the array 14 itself. Following the above balancing or optimization procedure as one observes the array 14 while being scanned the LEDs therein will exhibit varying brightness. For example, those LEDs at the outer edges of the array will be energized by drive currents, the values of which will have been adjusted for a longer light propagation distance.

Figure 16A:
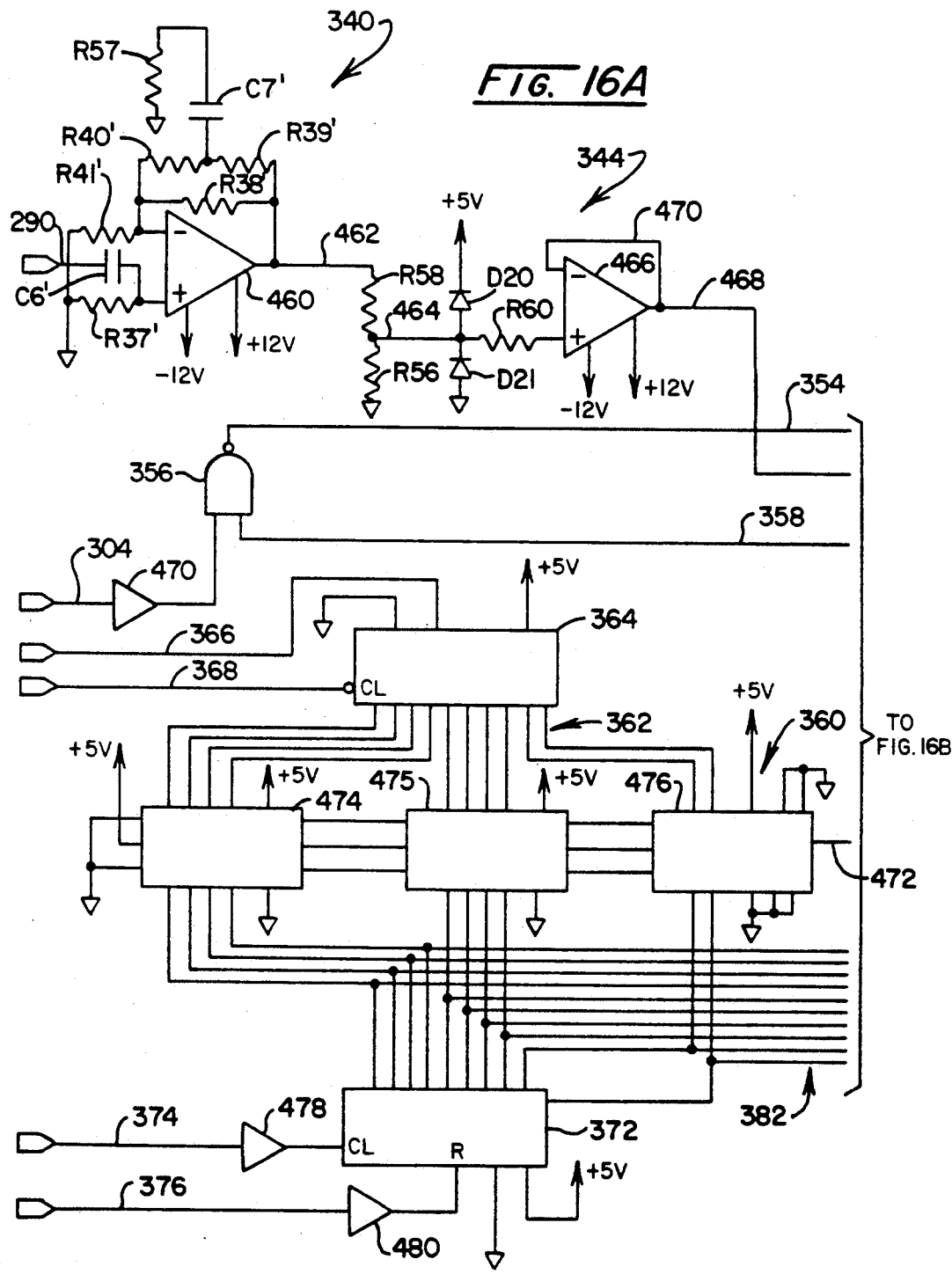

Referring to FIGS. 16A and 16B, the LED balancing interface components described in general in connection with FIG. 14 are revealed at an enhanced level of detail. The video amplifier stage represented at block 340, again is represented by that general identifying number. This stage is substantially identical to that described at 292 in connection with FIG. 12. Accordingly, the type LF356 operational amplifier of stage 340 is represented at 460 in conjunction with resistors and capacitors having the same identification as stage 292 but in primed fashion. One additional resistor R57, is seen coupled between capacitor C7' and ground. As before, the photodetected signal of receiver 30 is preamplified at a balance preamplification stage, whereupon it is submitted via line 290 to coupling capacitor C6' for assertion to the positive input of the operational amplifier 460. Stage 340 exhibits a bandpass centered at the system clock of 20 MHz and the output thereof at line 462 is directed through a limiter network 344. Network 344 includes voltage divider resistors R58 and R59 which are tapped at line 464 which is directed through resistor R60 to the positive input of a type LF356 operational amplifier 466. Diodes D20 and D21 limit any voltage excursions at line 464 from either exceeding 5 v or dropping below 0 v. The output of amplifier 466 at line 468 is both fed in feedback fashion to its negative input to provide a voltage follower function acting as a buffer for the purpose of feeding its signal with very low impedance into the analog-to-digital inverter 348 seen in FIG. 16B. Inverter 348 receives a write command at its $\overline{WR}$ terminal via line 354 and provides an output at 8 lead bus 350 which is directed to the earlier-noted port B of the computer employed in the balancing process. Converter 348 may be provided, for example, as a type ADC 0820.

The negative going write command or pulse at line 354 occurs as the output of NAND gate 356 shown in FIG. 16A. Gate 356 must receive two inputs to provide this write command, one being a sampling pulse as earlier described being developed at line 304 in FIG. 12, which is passed through a buffer stage 470. Device 470 may be provided, as a type 4050 buffer and serves to protect the circuit against transients which may be evolved in conjunction with the lengthy signal lines which may be encountered. The opposite input to gate 356 at line 358 is developed from the equals output of a magnitude comparator presented at line 472 which, in turn, extends to line 358. Magnitude comparator 360 is comprised of three type 74 C85 comparators 464–476 which are interconnected in series. Inputs to the magnitude comparator 360 representing earlier-described port A are derived from lead array 362 extending from binary counter 364. Counter 364 may be provided, for example, as a type 4040 and receives a computer generated reset signal from line 366 and a computer generated clock input from line 368. The latter input provides for cell or LED position identification from the computer. The compared input representing port B is developed at the lead array deriving from bus 382 and coupled with type 4040 12-bit binary counter 372. Counter 372 is fed the apparatus 10 generated 20 KHz system clock signal which is directed through a type 4050 buffer 478 to its clock input. Additionally, the reset input to counter 372 is coupled to receive the system sync signal from along line 376, such signal being buffered at buffer 480 which, also may be provided as a type 4050. Lines 374 and 376 have been described in conjunction with FIG. 14. Thus, a synchronism under the control of the computer is provided with the apparatus 10.

The output from binary counter 372 not only goes to the magnitude comparator 360, but also extends as represented at bus 382 to static RAM chip 378 as seen in FIG. 16B. Bus 382 is seen coupled with the address input to the RAM 378 and the count developed at counter 372 accordingly provides an address input to device 378 which calls up a current level value to be presented at the output of RAM 378 at bus 382. This 8-bit word will be present when the pulse to the $\overline{W}$ terminal is high by virtue of the control of the computer and the equality out line 472 of magnitude comparator 360. Note in this regard that line 472 extends to connection with line 358 which, in turn, extends to one input of a NAND gate 480. The opposite input thereto as generated by the computer is provided at line 380 which also extends via line 482 to the output enable, $\overline{OE}$ terminal of RAM 378. Thus, with the occurrence of an equality from comparator 360 and upon command of the computer, the output of NAND gate 480 at line 484 is directed via line 486 to the $\overline{W}$ or write terminal of RAM 378 to access the 8-bit word which has been addressed from bus 382. This 8-bit word, describing the current level for driving a selected LED is coupled to two locations. One location is to a digital-to-analog converter stage shown in general at 386. Stage 386 includes a type DAC1209 digital-to-analog converter 488, the data input terminals of which are coupled with bus 382 and the reference input to which is provided from line 490 and voltage reference network 492. Network 492 includes a resistor R61 and a voltage level device represented at symbol 494 which may be provided, for example, as a type LM3999Z. The output of converter 488 is directed via line 496 to the negative input of operational amplifier 500. The positive input to the device 500 is coupled to ground and the output thereof at line 138 is returned via line 502 and resistor R62 to the RFV terminal of device 488. Line 138, as described earlier in connection with FIG. 11, is directed to the voltage-to-current drive network 120 as described in conjunction with FIG. 11.

The second location to which communication is provided with respect to the data port of RAM 378 is to port A of the noted computer through a bi-directional bus buffer 384. Device 384 may, for example, be provided as a 74 LS573 and may be accessed when equality occurs in the magnitude comparator 360. Accordingly, in the event of such equality, it is possible for the computer to load new values for drive current into RAM 378 to provide for the noted incrementation or decrementation of drive values during the balancing or optimization process. When the computer is not writing through the buffer 384, its outputs are disabled from gate 480.

One of the substantial benefits recognized with the balancing of the array 14 of LEDs resides in the substantially broadened edge detection, width measurement and like capabilities of the apparatus 10.

In particular, the system now assumes a capability for measuring transparent or semi-transparent materials such as glass or clear plastics. The balanced or optimized LED feature of the invention is of particular importance with respect to transparent or translucent materials, inasmuch as the normal variations witnessed in LED intensities may be greater than the attenuation effects of these materials. It may be observed in connection with FIG. 1 that material 16 is depicted as being of a transparent variety. In addition to the necessity for balanced LED output characteristics, it also is necessary that the extrapolation procedure for deriving edge location from the output of the low pass filter stage as described at 310 in connection with FIG. 12 be altered. Where opaque materials are involved, the procedure is substantially as earlier described wherein the trigger point corresponding with 50% of the peak amplitude of an over-edge scan is utilized as the time based edge location. Where transparent or semi-transparent materials are employed, a very small difference may exist between the output of an LED which is fully covered by material 16 and the output of an LED of an array 14 which is fully uncovered. The difference in amplitudes may be as small as 7% to 10%. To derive the threshold trigger point for such transparent and semi-transparent materials, 50% of the difference between the maximum and minimum video signal seen during an edge scan is employed.

Figure 17:
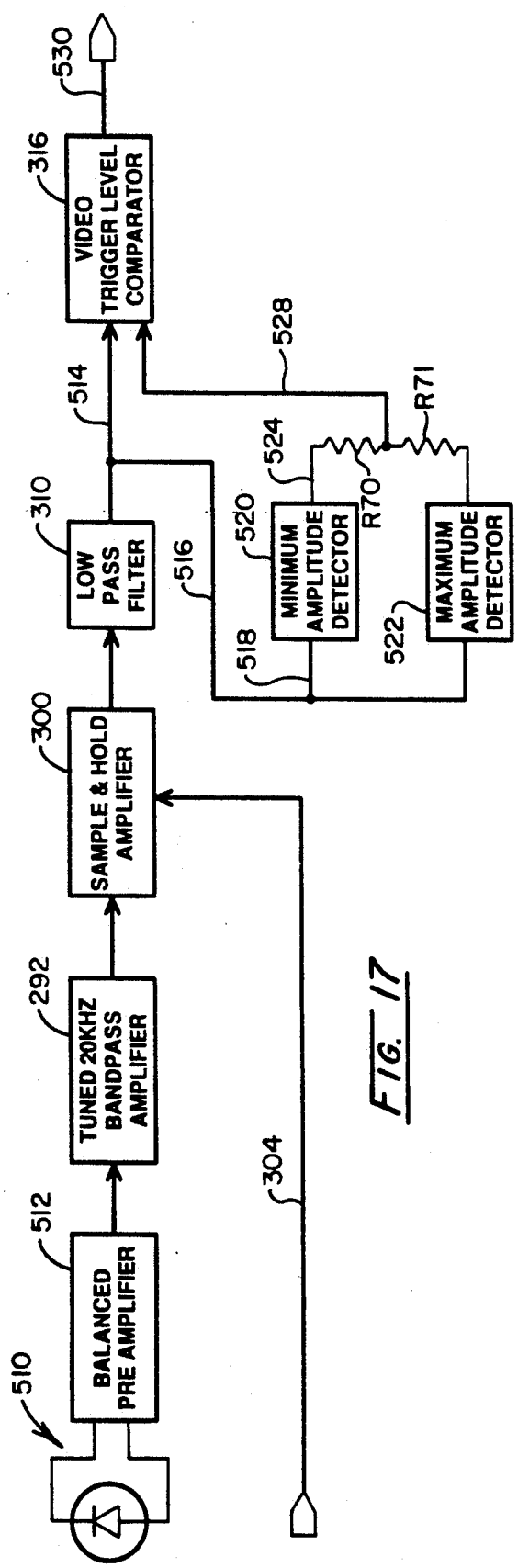
FIG. 17 is a block diagrammatic representation of signal treatment for the implementation of the present invention in edge location with respect to transparent and semi-transparent materials.

Referring to FIG. 17, a general block diagram of the components heretofore described is combined with a block diagrammatic representation of the components employed with the transparent and semi-transparent width measurement or edge detection. Where appropriate, the same numeration as described, for example in conjunction with FIG. 12, are retained. The photodetecting function is represented in symbolic fashion at 510 and is shown providing an output signal to a balanced preamplifier represented at block 512. The thus preamplified signal then is directed to a tuned 20 KHz bandpass amplifier earlier described at 292 and shown by that numeration in block form. A sample and hold amplifier 300 then samples the output of the amplifier stage 292 in conjunction with an enabling pulse from line 100 which provides a timed input corresponding with the presence of what is essentially the center point of the sample representing a light pulse being evaluated. The signals are then passed through low pass filter stage 310 to line 514 which directs the signal, including the noted smooth curve resulting from scanning across and edge of material 16, to the negative input of a comparator represented at 316. Line 514 is tapped at line 516 which, through line 518 is seen to be directed to a minimum amplitude detector function represented at block 520. This minimum amplitude detector finds the minimum attenuated signal value, i.e. representing an LED which is transmitting entirely through the transparent or semi-transparent material 16. Line 516 additionally is seen being directed to a maximum amplitude detector function represented at block 522. This detector finds the maximum value of signal, i.e. that signal which is unattenuated by the material 16. The resultant outputs of functions 520 and 522 are presented, as represented at respective lines 524 and 526, to a voltage divider function herein represented by resistors R70 and R71. The resultant signal at line 528 represents a value of voltage halfway between the minimum amplitude as detected and maximum amplitude as detected. This then serves as the trigger level or threshold level introduced to the positive input of the comparator function 316. A resultant edge defining signal then is developed at line 530 upon the level of the signal at line 514 reaching the threshold level asserted from line 528.

Figure 18:
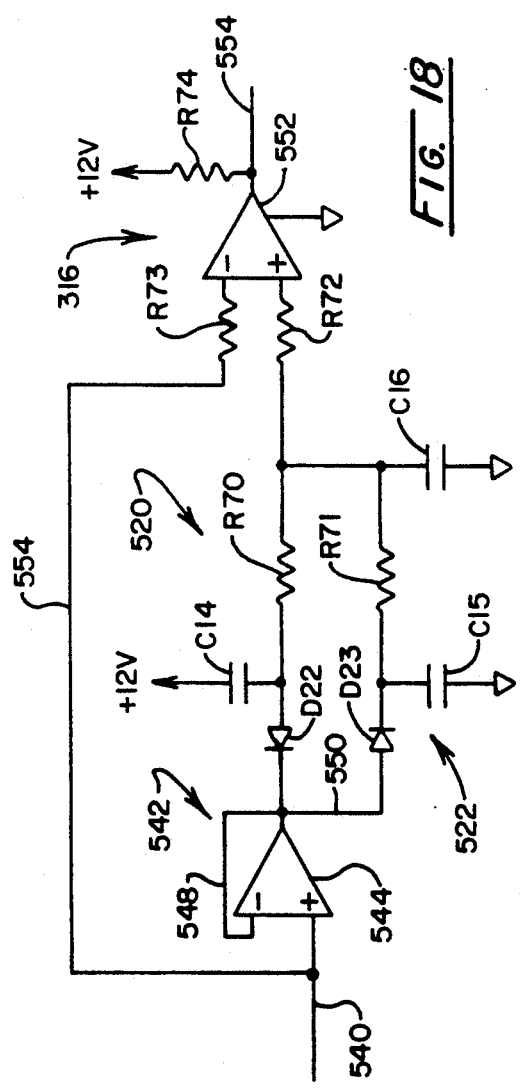
FIG. 18 is an electrical schematic diagram showing an adaptation of the circuit of FIG. 12 for performance in accordance with the presentation of FIG. 17.

Turning to FIG. 18, the minimum amplitude detection function and maximum amplitude detection functions as above discussed are revealed at an enhanced level of detail. In the figure, the output of the low pass filter stage, which represents a smooth curve in the event of an edge transition is directed as represented by line 540 to the positive input of a buffer stage represented generally at 542. Buffer 542 is formed, for example, as an operational amplifier 544 having an output at line 546 and a feedback to its negative input as represented at line 548. The device performs as a voltage follower and is provided such that its output at line 546 is a buffered signal with respect to the input at line 540 to avoid any distortion of this important signal at that line. Amplifier 544 may, for example, be provided as a type LF353. The output of buffer 542 at line 546 is directed to the detection functions earlier described at 520 and 522. The minimum amplitude detector function includes a diode D22 and capacitor C14, while the maximum amplitude detector includes diode D23 within line 548 and capacitor C15. The outputs of the detector stages, again labeled at 520 and 522, at respective lines 546 and 550, then are directed through voltage dividing resistors respectively shown at R70 and R71 in consonance with the identification of that function in FIG. 17. A capacitor C16 is coupled at the output of the divider combination for purposes of filtering and circuit stability.

At the time of initiation or being turned on, all three capacitors C14–C16 of the network normally will be discharged. As a video signal representing an edge transition is applied to buffer stage 542, it will be positive with respect to ground such that capacitor C15 will rise up to, for example, a 10 v value representing the peak value of the incoming signal, discounting diode drops or the like. Capacitor C14 on the other hand is referenced to +12 v such that any voltage of lesser value will discharge through diode D22 and, as the signal excursion of amplitude reduction occurs, it will, for example, reduce to 7 v which will be seen at line 546. This value will represent the minimum amplitude of the signal. As those signals are divided by the voltage divider function of resistors R70 and R71, for the example at hand, about an 8.5 v signal will be presented to the comparator 552 of stage 316. Simultaneously, the edge transition smooth curve signal will be presented along line 554 and through resistor R73 to the opposite input of the comparator 552 to derive a positive output at its output line 554. A pull-up resistor R74 is seen coupled between line 554 and +12 v.

Looking to FIG. 19, a schematic representation of the signal at lines 540 and 546 is represented at 560 in conjunction with the exemplary signal values described above. Note that two transitions are depicted representing the detection of each side, for example, 18 and 20 of transparent material 16 shown in FIG. 1. A threshold or trigger point for comparator 552 is shown at dotted line 562 in conjunction with small x's intercepting the transition curve at about 8.5 v. The resulting triggering information may be developed to evolve width data for material 16. Looking additionally to FIG. 20, for example, the width between trigger transitions 564 and 566 is represented as a function of the time between these transitions.

The apparatus 10 is tested for resolution and accuracy utilizing a standard testing procedure devised to produce repeatable results that can be traced back to the area of scan where an error might have occurred. The testing provides for evaluating the entire array 14 of LEDs.

To carry out testing, a test fixture was devised that would move a test sample of known width very slowly, i.e. at ½ inch per minute, from one end of the array as at 14 to the other while maintaining a constant pass line. The pass line is the separation distance between the object or test sample and the array 14. While moving the test object, measurements are taken operating the apparatus 10 in a normal manner and the data output of the apparatus 10 are processed into digital readings by a measurement processing unit. The measurement processing unit averages a burst of 100 readings and then makes that measurement average available to a digital display and at an RS-232 serial port. New readings are available once every second when using a 20 inch array 14 and once every 1.5 seconds where, for example, 30 inch arrays are under test. A personal computer, for example an IBM compatible device is used to gather data from the measurement processing unit RS-232 port. This computer performs in conjunction with a BASIC program which was written to accept data at the rate new data would be available, and to store all readings in a dimensioned array for statistical processing. This program also accepts the actual width of the sample being measured as an input from the operator. All readings taken by the program are compared to the actual width of the test object and the deviation from that width is represented as a position change for the print head of a dot matrix printer. A character is printed at the proper deviation position such that the computer and its associated printer serve as a "digital strip chart recorder". At the end of a test run, the program also computes the standard deviation of the readings and the printed maximum and minimum width reading errors.

Looking to FIG. 21, such a "strip chart" readout for a test of an apparatus 10 without the widened photodetector innovation, as well as without the optimization of LED output intensity as taught herein. For the readout shown, 843 readings were taken and each reading was 1.2 seconds apart. The maximum reading for the test was 5.29 inches and the minimum was 5.18 inches. Sigma or standard deviation for this test of the prior measuring apparatus was 19.76 mils.

Turning to FIG. 22, a test employing the same apparatus 10 but with the improvements of the instant invention including the expanded photodetector and the optimized LED emission outputs was carried out. A different test sample was employed and 1,109 readings were taken, the reading being spaced 1.2 seconds apart. The chart represented by the figure shows a substantial improvement. The maximum error reading was 4.79 inches and the minimum error reading was 4.76 inches. Sigma or standard deviation was 0.00571 inch. Accordingly, a substantial improvement in performance was realized.

A similar test was run to evaluate the performance of the apparatus with only the optimization of the LED array 14 feature as described above. The resulting trace was much smoother than that represented at FIG. 21, the size of the worst error being reduced by nearly 50%. However, periodic errors were evident in the trace. An analysis of these errors showed an error occurrence whenever an edge being measured fell in a path between the small dark gap between two adjacent LEDs in the array and center of the receiver photodetector. An error cycle is observed once every 0.1 inch of sample travel with the worst error occurring when both edges of the measured test sample were positioned over gaps between the LEDs.

A similar test was run and chart generated with only the expanded photodetector feature of the invention. The resultant chart showed improvement over the performance represented in FIG. 21 but still exhibited large errors which were observed to be caused by uneven LED brightness levels. The largest errors observed occurred whenever a measured test object edge passed between two LEDs of the array 14 with significantly different brightnesses. The periodic errors from the gaps between LEDs were not evidenced in the chart which resulted.

Since certain changes may be made in the above method and apparatus without departing from the scope of the invention herein involved, it is intended that all matter contained in the above description or shown in the accompanying drawings shall be interpreted as illustrative and not in a limiting sense.

I claim:

1. Apparatus for locating an edge of material, comprising:
    an array of discrete light emitting devices located a select distance from one side of said material and extending partially outwardly from said edge, each said device being responsive to the application of a select value of current thereto to emit light of corresponding intensity;
    a photoresponsive receiver located a predetermined stand-off distance from the opposite side of said material and positioned for response to said light emitted by said devices which transitions between conditions of attenuation and non-attenuation in the vicinity of a said edge to derive output signals corresponding with the amplitudes thereof;
    a drive network responsive to control inputs for applying said select value of current to said discrete light emitting devices; and
    control means responsive to a predetermined drive value corresponding with each said light emitting device for deriving corresponding said control inputs to effect a said emission of light from each said device exhibiting substantially uniform intensity at said receiver when non-attenuated by said material and responsive to said photoresponsive receiver output signals for deriving a time based trigger signal corresponding with the location of said edge.

2. The apparatus of claim 1 in which said control means includes memory means addressable for providing said predetermined drive value corresponding with each of said light emitting devices.

3. The apparatus of claim 1 in which said control means comprises:

oscillator means for providing clock pulses occurring in a train of predetermined system clock frequency;

decoder means responsive to said clock pulses for timing the said application of current to sequentially disposed ones of said array of devices from the first thereof to the last thereof and deriving a sync signal at the conclusion of said application of said current to said last device;

counter means responsive to said clock pulses and said sync signal for sequentially deriving address values from a first thereof to a last thereof;

memory means responsive to each of said derived address values for providing a said predetermined drive value corresponding with each of said light emitting devices; and converter means responsive to each said drive value for deriving a voltage level corresponding therewith as a said control input.

4. The apparatus of claim 3 in which said drive network comprises a voltage-to-current converter responsive to each said converter derived voltage level to derive said select value of current.

5. The apparatus of claim 1 in which said photoresponsive receiver includes a silicon photodetector disposed in parallel relationship with said array of light emitting devices and having a lengthwise extent of about 9 cm.

6. The apparatus of claim 1 in which said photoresponsive receiver includes three silicon photodetectors mutually aligned along and symmetrical about an axis disposed in parallel relationship with said array of light emitting devices and electrically coupled in parallel circuit relationship.

7. The apparatus of claim 1 in which:

said material causes said light emitted by said devices to transition between conditions of non-attenuation and partial attenuation; and said control means derives said time based trigger signal at a location in time between a transition of said output signals representing a maximum said amplitude and a minimum said amplitude.

8. The apparatus of claim 7 in which said location in time is selected in correspondence with an amplitude value occurring midway between said minimum amplitude and said maximum amplitude.

9. The method for locating an edge of material, comprising the steps of:

providing an array of first to last mutually spaced discrete light emitting devices disposed generally along an array axis, each said device being responsive to the application of a drive current thereto to emit light;

positioning said array a select distance from one side of said material and at a location extending partially outwardly from said edge;

providing a photoresponsive receiver including a photodetector having a lengthwise photodetector axis and a length along said axis of at least about 6 cm;

positioning said photoresponsive receiver at a predetermined stand-off distance from said material, in light receiving relationship with said array, and oriented so as to position said photodetector axis in substantially parallel relationship with said array axis;

discretely energizing each of said light emitting devices in a sequence between the first and last thereof by the application of said drive current thereto at a predetermined system frequency;

detecting with said photodetector the light emitted by said light emitting devices which is partially attenuated and non-attenuated by said material to derive output signals at said system frequency which exhibit amplitude data; and correlating said amplitude data with time and location based data derived from said system frequency to derive a signal representing the location of the edge of said material.

10. The method of claim 9 in which said photoresponsive receivers are provided as three silicon photodetectors mutually aligned along and symmetrical about said photodetector axis and electrically coupled in parallel circuit relationship.

11. The method of claim 9 in which said step for energizing each of said light emitting devices is carried out by applying a unique drive current thereto selected for evoking said output signals at said photodetector which are of substantially uniform amplitude in the absence of attenuation by said material.

12. The method of claim 11 in which said step for energizing each said device is carried out by:

retaining a unique value for each said unique drive current in memory;

accessing said memory for a said unique value in conjunction with each said light emitting device energization;

converting said accessed unique value to a unique voltage value; and converting said unique voltage value to said unique drive current.

13. The method of claim 12 in which said accessing of said memory is carried out by the counter generation of sequential addresses with respect to each of said light emitting devices from said first to said last at said predetermined system frequency.

14. In a system for locating the edge of material wherein a linear array of a number of mutually spaced light emitting devices are positioned from first to last at a predetermined location spaced from said material and extending outwardly from said edge, said devices being energized in response to the application of drive current thereto to emit light of given intensity, and a photoresponsive receiver is spaced from the opposite side of said material a predetermined distance from said linear array of light emitting devices and provides output signals of amplitudes varying with said intensity of emitted light modulated with respect to the attenuation thereof by said material, the method for optimizing the light emitting performance of said light emitting devices, comprising the steps of:

positioning said photoresponsive receiver substantially at said distance from said array;

determining an initial value for said drive current;

initially energizing each said device with said initial value of drive current and deriving said output signal with said photoresponsive receiver corresponding with the intensity of emitted light of each when detected by said receiver;

summing said derived output signals and dividing said sum by said number of light emitting devices to provide an average value thereof;

test energizing each said device with a value of said drive current which has been adjusted by a predetermined increment value selected to effect a convergence of the value of said adjusted drive current with said average value;

deriving a said output signal with said photoresponsive receiver corresponding with the intensity of emitted light of each of said device; and reiterating said steps of test energizing each said device, and deriving a said output signal until a set of final values of drive current are produced representing a select convergence between said derived output signals and an average value thereof.

15. The method of claim 14 including the step of recording said final values of drive current in memory, accessible at address locations corresponding with said first to last positions.

16. The method of claim 14 wherein said step reiterating said steps of test energizing each said device and deriving a said output signal includes said step of summing said derived output signals and dividing said sum by said number of light emitting devices.

17. The method for locating an edge of material, comprising the steps of:

providing an array of first-to-last discrete light emitting devices, each said device being responsive to the application of a drive current thereto to emit light of corresponding intensity;

positioning said array a select distance from one side of said material and at a location extending partially outwardly from said edge;

providing a photoresponsive receiver including a photodetector;

positioning said photoresponsive receiver at a predetermined stand-off distance from said material, in light receiving relationship with said array;

discretely energizing each of said light emitting devices in a sequence occurring between the first and last thereof by applying, at a predetermined system frequency, a unique said drive current thereto selected for generating said emitted light therefrom exhibiting substantially constant amplitude at said receiver in the absence of attenuation by said material;

detecting, with said photodetector, the light emitted by said light emitting devices which is partially attenuated and non-attenuated by said material to derive output signals at said system frequency which exhibit amplitude data; and correlating said amplitude data with time and location based data derived from said system frequency to derive a signal representing the location of the edge of said material.

18. The method of claim 17 in which said step for discretely energizing each of said light emitting devices includes the steps of:

providing a memory addressable to provide a unique value for each said unique drive current;

accessing said memory for a said unique value in conjunction with each said light emitting device energization;

converting said accessed unique value to a unique voltage value; and converting said unique voltage value to said unique drive current.

19. The method of claim 18 in which said step for accessing said memory is carried out by the counter-generation of sequential addresses with respect to each of said light emitting devices from said first to said last at said predetermined system frequency.

20. The method of claim 17 in which said correlating step derives said timebased trigger signal at a location in time between a transition of said output signals representing a maximum amplitude and a minimum amplitude of detected light intensity when said material is light transmissive.

21. The method of claim 20 in which said location in time occurs at a said amplitude corresponding with the midpoint between said minimum amplitude and said maximum amplitude.

* * * * *

UNITED STATES PATENT AND TRADEMARK OFFICE
CERTIFICATE OF CORRECTION

PATENT NO. : 5,220,177

DATED : June 15, 1993

INVENTOR(S) : David E. Harris

It is certified that error appears in the above-indentified patent and that said Letters Patent is hereby corrected as shown below:

IN THE DRAWINGS

Fig. 14 should be amended as follows:

"In the original formal drawing, at the top of the sheet, an arrow is pointing at the wrong direction at line 354. That direction should be toward block 348. At the bottom of the figure the number "282" is changed to --382--; and the number "286" is changed to --386--. Finally, the arrow is reversed at line 138 at the bottom of the drawing."

Col. 4, line 30, before "adjusted" insert --output signals representing the--.

Col. 5, line 10, change "references" to --reference--.

Col. 10, line 56, change "110" to --105--; and
Col. 10, line 56, change "140" to --104--.

Col. 16, line 56, change "command to --commands--; and
Col. 16, line 56, change "is" to --are--.

Col. 17, line 21, change "an" to --and--.

UNITED STATES PATENT AND TRADEMARK OFFICE
CERTIFICATE OF CORRECTION

PATENT NO. : 5,220,177
DATED : June 15, 1993
INVENTOR(S) : David E. Harris

It is certified that error appears in the above-indentified patent and that said Letters Patent is hereby corrected as shown below:

Col. 27, claim 14, lines 1-5, the paragraph should read:

--test energizing each said device with a value of said output signals representing said drive current which has been adjusted by a predetermined increment value selected to effect a convergence of the value of said adjusted drive current with said average value;--

Signed and Sealed this

Fifteenth Day of November, 1994

Attest:

BRUCE LEHMAN

*Attesting Officer*     *Commissioner of Patents and Trademarks*